(12) United States Patent
Evans

(10) Patent No.: US 10,112,728 B2
(45) Date of Patent: Oct. 30, 2018

(54) DRONE CHARGING STATIONS

(71) Applicant: Michael Steward Evans, San Jose, CA (US)

(72) Inventor: Michael Steward Evans, San Jose, CA (US)

( * ) Notice: Subject to any disclaimer, the term of this patent is extended or adjusted under 35 U.S.C. 154(b) by 0 days.

(21) Appl. No.: 15/950,018

(22) Filed: Apr. 10, 2018

(65) Prior Publication Data

US 2018/0229859 A1 Aug. 16, 2018

Related U.S. Application Data

(63) Continuation-in-part of application No. 15/260,670, filed on Sep. 9, 2016, now Pat. No. 9,937,808.

(60) Provisional application No. 62/613,285, filed on Jan. 3, 2018.

(51) Int. Cl.
| | |
|---|---|
| *B64C 39/02* | (2006.01) |
| *G05D 1/00* | (2006.01) |
| *G08G 5/00* | (2006.01) |
| *B64F 1/36* | (2017.01) |
| *H02J 7/02* | (2016.01) |

(52) U.S. Cl.
CPC .......... *B64F 1/362* (2013.01); *B64C 39/024* (2013.01); *G05D 1/0027* (2013.01); *G08G 5/0013* (2013.01); *H02J 7/025* (2013.01); *B64C 2201/042* (2013.01); *B64C 2201/066* (2013.01); *B64C 2201/128* (2013.01); *G08G 5/0095* (2013.01)

(58) Field of Classification Search
CPC ........ B64F 1/362; H02J 7/025; G08G 5/0095; G08G 5/0013; G05D 1/0027; B64C 39/024; B64C 2201/066; B64C 2201/042; B64C 2201/128
See application file for complete search history.

(56) References Cited

U.S. PATENT DOCUMENTS

| | | | | |
|---|---|---|---|---|
| 5,503,350 A | * | 4/1996 | Foote | B64C 39/024 244/1 R |
| 7,714,536 B1 | * | 5/2010 | Silberg | B60L 11/002 191/10 |
| 8,511,606 B1 | * | 8/2013 | Lutke | B64C 39/028 244/100 R |
| 8,899,903 B1 | * | 12/2014 | Saad | B65G 67/00 414/392 |
| 9,087,451 B1 | * | 7/2015 | Jarrell | G08G 5/0069 |

(Continued)

*Primary Examiner* — Tyler J Lee
(74) *Attorney, Agent, or Firm* — Donald R. Boys; Central Coast Patent Agency, LLC

(57) ABSTRACT

A charging system for a drone carrying a passenger pod has a base structure connected to a power grid, a row of substantially planar wireless charging pads supported by the base structure, and a computerized controller enabled to communicate with a drone and to initiate, control and stop charging power. As a drone carrying a passenger pod approaches the charging-system, the computerized controller directs the moving drone into a path bringing a charging receiver pad of the passenger pod carried by the drone, and connected to a battery of the passenger pod, into proximity with the row of substantially planar charging pads, and directs the drone to move the carried passenger pod along the row of charging pods, managing speed and direction of the moving drome along the path, as charging of the battery of the passenger pod is accomplished.

20 Claims, 17 Drawing Sheets

(56) References Cited

U.S. PATENT DOCUMENTS

| | | | | |
|---|---|---|---|---|
| 9,387,928 B1* | 7/2016 | Gentry | | B64C 39/024 |
| 9,527,392 B2* | 12/2016 | Peverill | | B64C 39/024 |
| 9,527,605 B1* | 12/2016 | Gentry | | B64F 1/12 |
| 9,643,507 B2* | 5/2017 | Scarlatti | | B60L 11/1827 |
| 9,878,787 B2* | 1/2018 | Chan | | B64C 39/024 |
| 9,902,504 B2* | 2/2018 | Moore | | B64F 1/00 |
| 9,975,634 B2* | 5/2018 | Von Novak, III | | B64C 39/024 |
| 2006/0249622 A1* | 11/2006 | Steele | | B64F 1/02 |
| | | | | 244/115 |
| 2012/0016538 A1* | 1/2012 | Waite | | G01C 21/20 |
| | | | | 701/3 |
| 2012/0250010 A1* | 10/2012 | Hannay | | G01N 21/952 |
| | | | | 356/237.1 |
| 2013/0081245 A1* | 4/2013 | Vavrina | | B60L 11/1822 |
| | | | | 29/402.08 |
| 2014/0032034 A1* | 1/2014 | Raptopoulos | | G08G 5/0069 |
| | | | | 701/25 |
| 2015/0021442 A1* | 1/2015 | Hunter | | B64D 27/24 |
| | | | | 244/53 R |
| 2015/0097530 A1* | 4/2015 | Scarlatti | | B60L 11/1827 |
| | | | | 320/109 |
| 2015/0162867 A1* | 6/2015 | Meringer | | H02S 20/20 |
| | | | | 362/183 |
| 2015/0239578 A1* | 8/2015 | McGeer | | B64F 1/02 |
| | | | | 244/110 R |
| 2015/0259078 A1* | 9/2015 | Filipovic | | H04W 88/08 |
| | | | | 244/114 R |
| 2015/0266575 A1* | 9/2015 | Borko | | B64C 39/024 |
| | | | | 701/3 |
| 2015/0336669 A1* | 11/2015 | Kantor | | G01C 21/3415 |
| | | | | 701/3 |
| 2016/0009402 A1* | 1/2016 | Hunter | | B64D 27/24 |
| | | | | 244/53 R |
| 2016/0144982 A1* | 5/2016 | Sugumaran | | B64C 25/32 |
| | | | | 244/103 R |
| 2016/0196756 A1* | 7/2016 | Prakash | | B64C 39/024 |
| | | | | 701/3 |
| 2016/0200207 A1* | 7/2016 | Lee | | B60L 11/1816 |
| | | | | 320/109 |
| 2016/0221688 A1* | 8/2016 | Moore | | B64F 1/00 |
| 2016/0257423 A1* | 9/2016 | Martin | | B64F 1/00 |
| 2016/0325834 A1* | 11/2016 | Foster | | B64C 39/024 |
| 2016/0376031 A1* | 12/2016 | Michalski | | B64F 1/36 |
| | | | | 701/15 |
| 2017/0015414 A1* | 1/2017 | Chan | | B64C 39/024 |
| 2017/0015415 A1* | 1/2017 | Chan | | B64C 39/024 |
| 2017/0028863 A1* | 2/2017 | Meringer | | B60L 11/1825 |
| 2017/0110901 A1* | 4/2017 | Amarasekara | | H02J 50/10 |
| 2017/0137138 A9* | 5/2017 | Hunter | | B64D 27/24 |
| 2017/0139409 A1* | 5/2017 | Clarke | | G05D 1/0011 |
| 2017/0275025 A1* | 9/2017 | Johnson | | B64F 1/362 |
| 2017/0366980 A1* | 12/2017 | Priest | | H04W 16/18 |
| 2018/0126871 A1* | 5/2018 | Martinotti | | B60L 13/10 |
| 2018/0141657 A1* | 5/2018 | Han | | B64C 39/024 |
| 2018/0151045 A1* | 5/2018 | Kim | | G08B 21/02 |
| 2018/0194469 A1* | 7/2018 | Evans | | B64D 9/00 |

* cited by examiner

DRONE CHARGING STATIONS

CROSS-REFERENCE TO RELATED DOCUMENTS

The instant application is a Continuation-In Part (CIP) of and claims priority to pending application Ser. No. 15/260,670, filed Sep. 9, 2016, and to provisional application 62/613,285, filed Jan. 3, 2018. All disclosure of the parent applications are incorporated herein at least by reference.

BACKGROUND OF THE INVENTION

1. Field of the Invention

The present invention is in the field of electric vehicle charging, and pertains more particularly to passenger drones.

2. Description of Related Art

Passenger drones in the coming years will slowly replace cars and small trucks, and will be able to carry one passenger, or multiple, or goods. They will be autonomous, although under the control of networks, not humans. Most drones will be battery driven because battery technology is becoming cost competitive and improving rapidly, enabling batteries to store more energy while decreasing in size and weight. All drones will need to be recharged or refueled on longer journeys.

Besides battery technology, other new technologies exist today to make passenger drones quite feasible: Examples are Internet of Things (IoT) to enable communication between a wide range of electronic devices; collision avoidance including using video recognition; highly intelligent electronics that are also lightweight, cheap and small; advanced radio communications, such as the latest WiFi specifications and upcoming 5G variants; and new flying technologies and materials that are lightweight and strong. Also the demand is now here for two major reasons. Firstly, three-dimensional, above ground transport avoids rush hour traffic jams, where commuters all over the world get stuck every morning and evening wasting valuable time on a 2-dimensional surface. Second, for environmental reasons, because batteries plus electric motors eliminate the need for fossil fuels and are now cost competitive. Therefore, what is clearly needed is a way to quickly and efficiently recharge or refuel drones to allow for traveling on longer journeys than may be sustained on a single charge.

BRIEF SUMMARY OF THE INVENTION

In an embodiment of the invention a charging system for a drone carrying a passenger pod is provided, comprising a base structure connected to a power grid, a row of substantially planar wireless charging pads supported by the base structure, and a computerized controller enabled to communicate with a drone and to initiate, control and stop charging power. As a drone carrying a passenger pod approaches the charging system, the computerized controller directs the moving drone into a path bringing a charging receiver pad of the passenger pod carried by the drone, and connected to a battery of the passenger pod, into proximity with the row of substantially planar charging pads, and directs the drone to move the carried passenger pod along the row of charging pods, managing speed and direction of the moving drome along the path, as charging of the battery of the passenger pod is accomplished.

In one embodiment the system further comprises a plurality of rows of substantially planar wireless charging pads, individual ones of the rows facing in different directions, and positioned at different levels, enabling a plurality of drones carry passenger pods to charge the pod batteries. Also in one embodiment, the row of charging pads is sized to accommodate a drone carrying a plurality of passenger pods. In one embodiment the rows of charging pads are supported from a central pole structure. And in one embodiment, the rows of charging pads are supported by framework on a roof of a building.

In one embodiment the rows of charging pads are supported in a framework between two buildings. Also in one embodiment, the row of substantially planar charging pads is oriented with the plane of the row substantially vertical, to accommodate receiver pads on drones that are oriented substantially vertically. In one embodiment, the computerized controller interacts with a drone, determining whether the drone can reach a next destination, how much charge is required, and a rate of charging to accomplish the charge. In one embodiment, the computerized controller communicates with other charging systems at other geographic locations. And in one embodiment, the system further comprises a central computer system managing and gathering data from and sharing data with a plurality of charging stations.

In another aspect of the invention, a method for charging a battery of a passenger pod carried by a drone is provided, comprising providing a a row of substantially planar wireless charging pads supported by a base structure connected to a power grid, communicating with the drone carrying the passenger pod by a computerized controller, directing the drone into a path bringing a charging receiver pad of the passenger pod carried by the drone, and connected to a battery of the passenger pod, into proximity with the row of substantially planar wireless charging pads, and directing the drone to move the carried passenger pod along the row of charging pods, managing speed and direction of the moving drome along the path, as charging of the battery of the passenger pod is accomplished.

In one embodiment o the method further comprises a plurality of rows of substantially planar wireless charging pads, individual ones of the rows facing in different directions, and positioned at different levels, wherein drones are directed to follow individual ones of the rows of pads. Also in one embodiment, the row of charging pads is sized to accommodate a drone carrying a plurality of passenger pods. Also in one embodiment, the rows of charging pads are supported from a central pole structure. And in one embodiment, the rows of charging pads are supported by framework on a roof of a building.

In one embodiment of the method, the rows of charging pads are supported in a framework between two buildings. Also in one embodiment, the row of substantially planar charging pads is oriented with the plane of the row substantially vertical, to accommodate receiver pads on drones that are oriented substantially vertically. In one embodiment the computerized controller interacts with a drone, determining whether the drone can reach a next destination, how much charge is required, and a rate of charging to accomplish the charge. In one embodiment, the computerized controller communicates with other charging systems at other geographic locations. And in one embodiment the method further comprises a central computer system managing and gathering data from and sharing data with a plurality of charging stations.

DETAILED DESCRIPTION OF THE INVENTION

Figure 1:
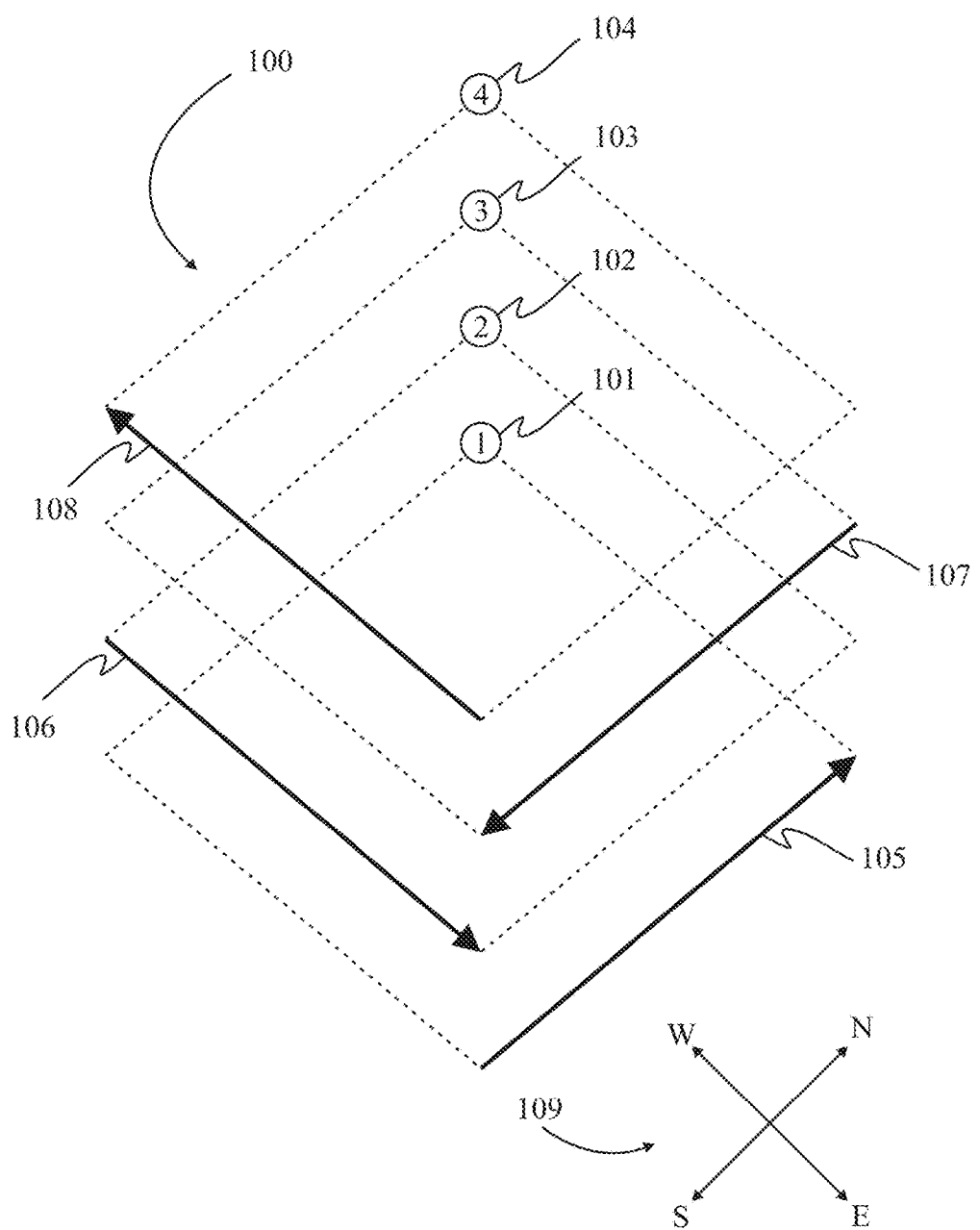
FIG. 1 is an illustration of a proposed droneway according to one embodiment of the present invention

FIG. 1 is an illustration of a proposed droneway 100 according to one embodiment of the present invention. For the system described herein, a droneway is a range of altitude designated for only drone travel. For example, an altitude of say 100 feet to 400 feet (30 m to 120 m) above ground level may be reserved in a droneway system with four or more levels. The droneway shown in FIG. 1 comprises four levels: A first level 101 is designated for drones traveling generally northward as indicated by arrow 105, a second level 102 is designated for drones traveling generally eastward as indicated by arrow 106, a third level 103 is designated for drones traveling generally southward as indicated by arrow 107, and a fourth level 104 is designated for drones traveling generally westward as indicated by arrow 108. The directions indicated in this embodiment are used just as an example, and are not a set standard. Each level is specified at a different altitude, and the distance between levels may be adjusted depending of needs of the system. For example, a droneway that incorporates a level specifically for mass transit of freight, might have more head space to accommodate larger drones. It should be understood that the processes described in this application may be implemented even if this or another proposed droneway is not used. A compass 109 is provided for reference of relative directions of FIG. 1.

Figure 2:
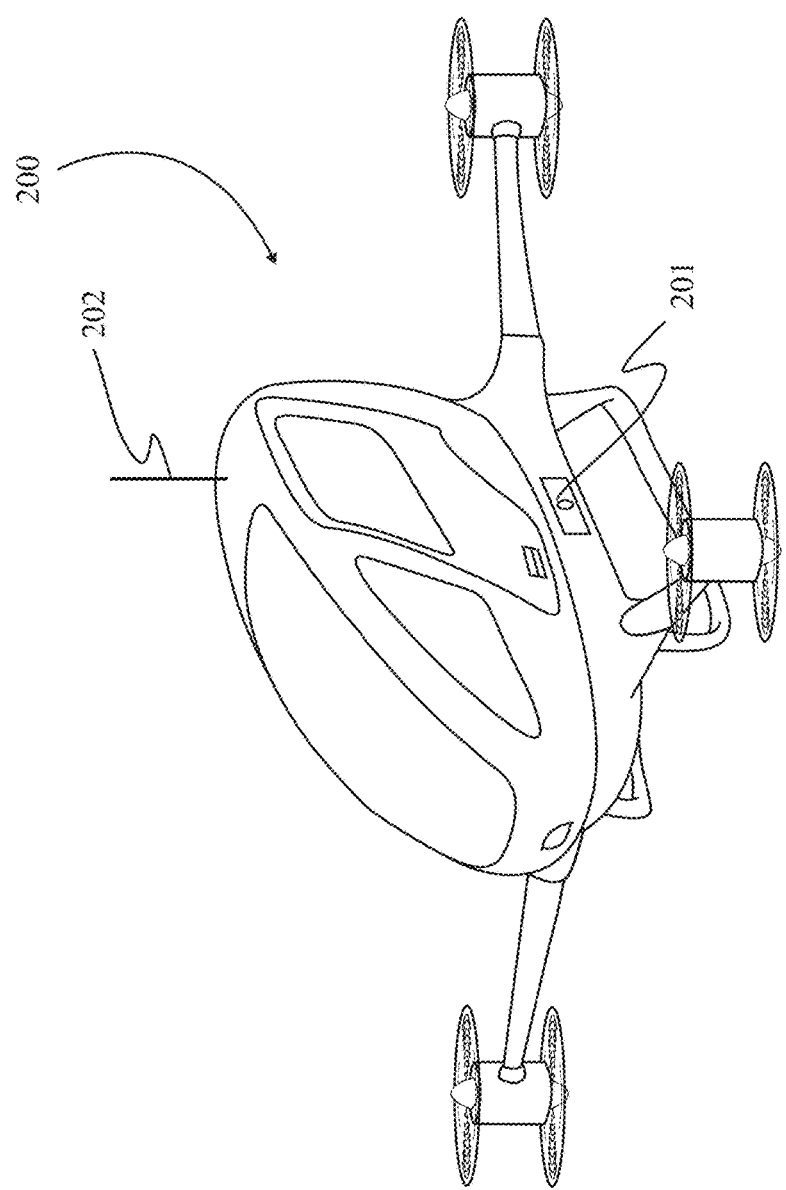
FIG. 2 is an illustration of an example drone adapted for usage in various embodiments of the present invention.

FIG. 2 is an illustration of an example drone 200 adapted to be used in various embodiments of the present invention. The drone used as an example here is modeled after a drone from EHANG, with model name EHANG184, which was unveiled at the Consumer Electronics Show in Las Vegas in 2016. Other notable features of the EHANG184 drone are its load capacity of 100 kilograms, a cruise time of 23 minutes on a full charge, and an average travel speed of about 100 kilometers per hour, with a range of about 40 km.

Drone 200 has a charging port 201 in an easily accessible place to receive a charging mechanism. Charging ports may be present on either or both sides for convenience and ease of access. Drone 200 may have an antenna 202, or some other means for facilitating wireless communication. It will be apparent to the skilled person that antenna 202 is exemplary, and that different communication systems may have different antennas. Drone 200 may also have an onboard computer not shown in the drawing to operate the systems of drone 200, and to handle such tasks as communications with charging systems, communications towers, and other drones using some standard communications protocol; handling course correction due to weather conditions; collision sensors to avoid obstacles and obstructions; and to receive and transmit localized and broad system emergency alerts.

Figure 3:
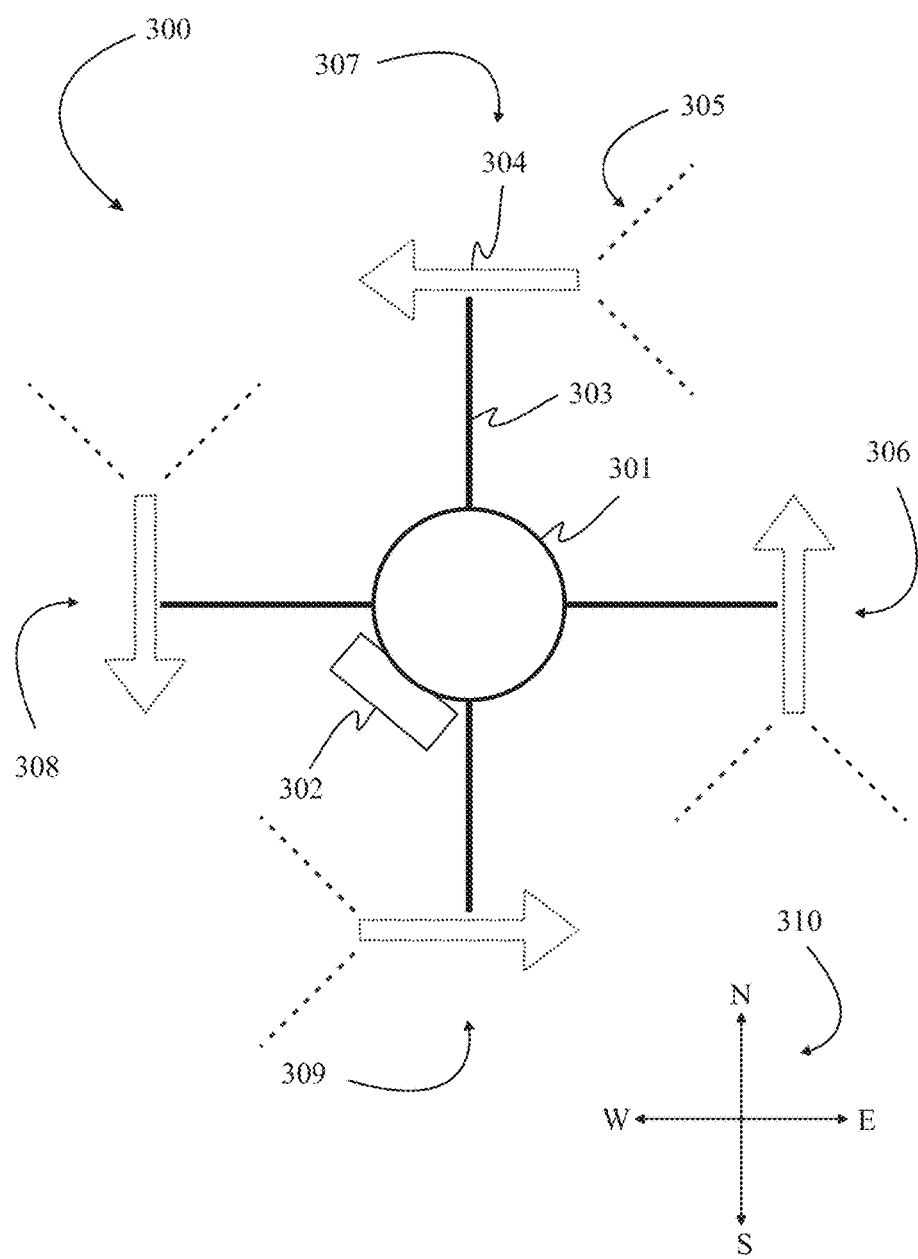
FIG. 3 is an illustration of an overhead view of a charging station according to various embodiments of the present invention.

FIG. 3 is an overhead illustration of a charging station system 300 in one embodiment of the invention. Charging station system 300 comprises a central pole 301, in which electronics and charging equipment may be present, and a controller 302. The pole may be either at ground level or mounted on the roof of a building, or may be implemented on some existing tower. The functions of controller 302 include, but are not limited to, communications with drones, communications with other charging stations, communications with a central computer, general communications, emergency alert systems, regulation of charging power depending on needs of presently charging drones, and collection of localized weather data. Charging station system 300 in this embodiment uses four charge locations: a charging location 306 for north traveling drones, a charging location 307 for westward traveling drones, a charging location 308 for southward traveling drones, and a charging location 309 for eastward traveling drones. Each of charging locations 306, 307, 308, and 309 resides at different altitudes, similar to the layout of proposed droneway 100 in FIG. 1. It should be understood that any number of charging locations may be safely implemented, with the amount of space, and power provided from a power grid being an important limitation.

The altitude of charging locations in station system 300 is not meant to suggest that drones serviced by the station will necessarily travel from station to station at the same altitude as the charging locations, which are located on a station system supported at ground level, or some other hard surface. Drones may very well be controlled to fly at a different altitude, and to change altitude approaching and leaving a charging station.

Each charging location 306, 307, 308, and 309 in this example comprises a charging mechanism 303, a charging zone 304, and a pre-designated entry zone 305. Various embodiments of charging mechanism 303 are described below in enabling detail in FIGS. 4A to 6B. In some embodiments, it is possible to use a combination of different charging mechanisms for each charge location. The charging zone 304 is defined as an area in which a drone may be connected to a charging mechanism 303, and may receive a charge. In this embodiment, the charging zone is ±45 degrees from the direction of arrow 304. In this example, active charging zone 304 is denoted by an illustration of an arrow indicating the path in which a charging drone may travel. Pre-designated entry zone 305 is an area in which incoming drones are received by any specific charging areas. In this embodiment, the entry zone is approximately ±45 degrees from the entry of each active charging area. Referential compass 310 is provided for positional reference according to this embodiment, but may in fact be in any direction.

Figure 4A:
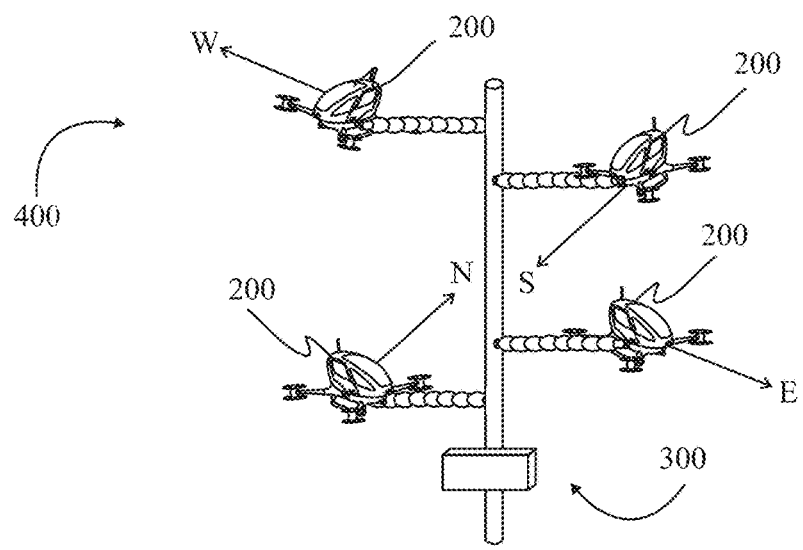
FIG. 4A is an illustration of a cable charging implementation according to one embodiment of the present invention.
Figure 4B:
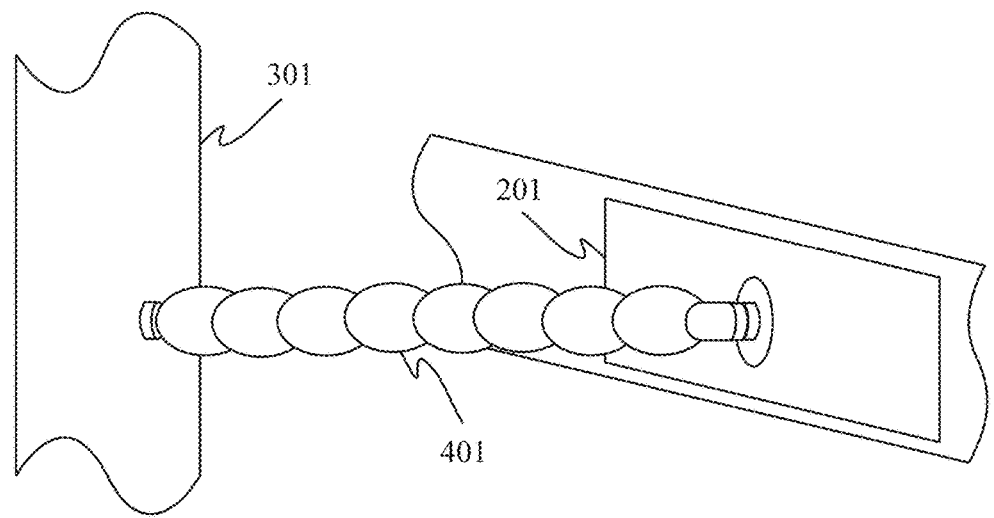
FIG. 4B is an expanded view of a single cable charging mechanism connecting to a drone's charging port according to one embodiment of the present invention.

FIG. 4A is an illustration of an articulated cable charging system 400, and FIG. 4B is an expanded view of a single connection in the articulated cable charging system according to one embodiment of the present invention. In this embodiment, drones 200 are connected to the articulated cable charging station system 400 via a computer controlled, mechanically articulated cable. The articulated cable is made up of a plurality of segments that are connected by joints to adjacent segments. A primary conductor within the cable must be able to carry sufficient current for charging, and will be on the order of 1 cm in diameter, if in fact a single cable. In some embodiments the primary conductor may be a woven, multi-strand element capable of articulation in the area of the joints of the articulated cable. Each joint connection may contain a means to provide movement with the use of computerized instructions, such as small motors. This provides the plug at the end of the articulated cable with a degree of movement, and enables it to accomplish tasks such as automatic plugging, automatic unplugging, and automatic positioning. As a drone 200 reaches a charging zone entry, articulated cable 401 is expected to be on standby, and automatically moves to and connects with a charging port 201 of drone 200. The articulated cable may be able to find charging port 201 through the use of sensors, such as through video recognition or with use of laser beams or magnetic attraction or some other means of accurate alignment in both the horizontal and vertical axes. If the drone battery becomes fully charged, or as drone 200 reaches the charging zone exit, the charging current is switched off and then articulated cable 401 disconnects automatically, and quickly returns to the charging zone entry, and is on standby for a next incoming drone to charge. In some embodiments it is not necessary that the drone be moving through the charging zone at all times, and drones may hover for a time to receive a charge. In the case of the articulated cable, as shown in FIG. 4B, the cable may be provided with a certain amount of slack to be able to handle effects of wind.

Figure 5A:
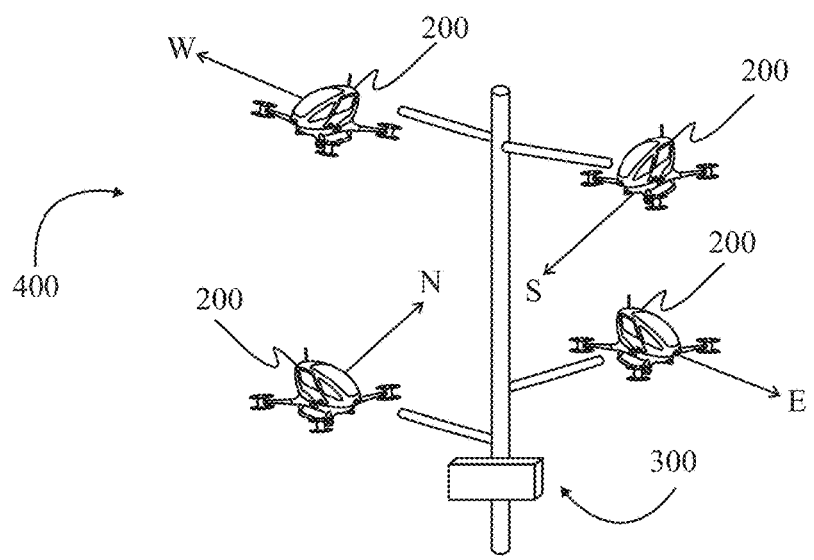
FIG. 5A is an illustration of a wireless charging implementation according to one embodiment of the present invention.
Figure 5B:
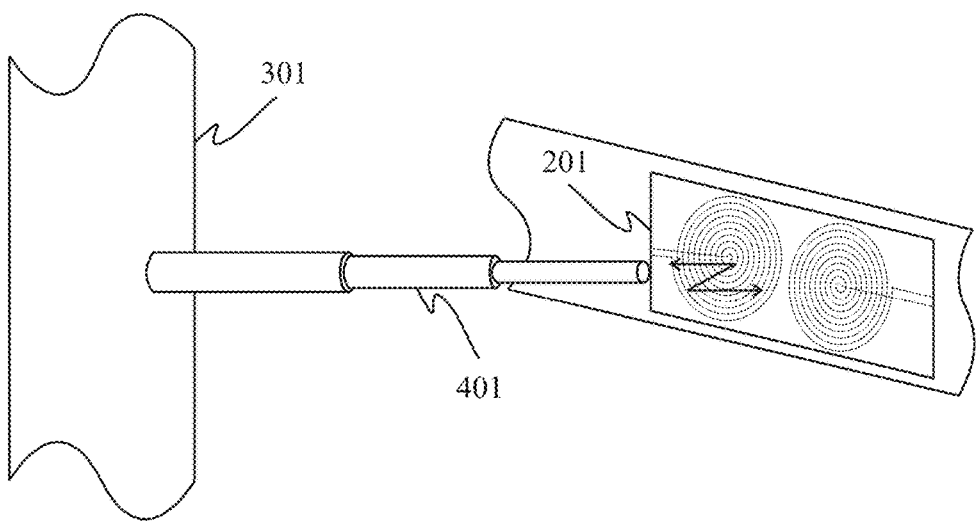
FIG. 5B is an expanded view of a single wireless charger wirelessly charging a drone according to one embodiment of the present invention.

FIG. 5A is an illustration of a wireless charging station system 500, and FIG. 5B is an expanded view of a single connection from wireless charging station system 500 according to one embodiment of the present invention. Generally, wireless charging exhibits higher power efficiency by reducing distance between a wireless power transmitter and a wireless power receiver. In this embodiment, wireless charging station system 500 uses a mechanically movable and extendable rod 501 embedded with wireless charging hardware as the wireless power provider to reach a charging port 201 of a drone 200 adapted to receive power wirelessly from extendable rod 501. Charging port 201 may have a large area where it may receive a charge wirelessly from extendable rod 501 to account for unintended movement caused by external influences, such as strong winds.

As drone 200 approaches a charging zone of wireless charging station system 500, and positions at a correct altitude, rod 501 may move laterally to line up with charging port 201 to achieve the most efficient charge rate possible in that particular instance, and the extendable rod 501 extends to close the distance between the extendable rod 501 and charging port 201, but may not make physical contact. As drone 200 cruises through the charging zone at a pre-determined speed, charging rod 501 retracts as needed to the half way point and then extends after the half way point—to provide a charge wirelessly for the entire duration while drone 200 is in the charging zone. Once drone 200 reaches the charging zone exit, the charging power is switched off and charging rod 501 retracts away from drone 200, and positions back to the charging zone entry. At this point, charging rod 501 is on standby, ready to engage a next incoming drone. And in some embodiments a drone may stop and hover for a time, and the charging rod may stop moving as well for that time.

Figure 6A:
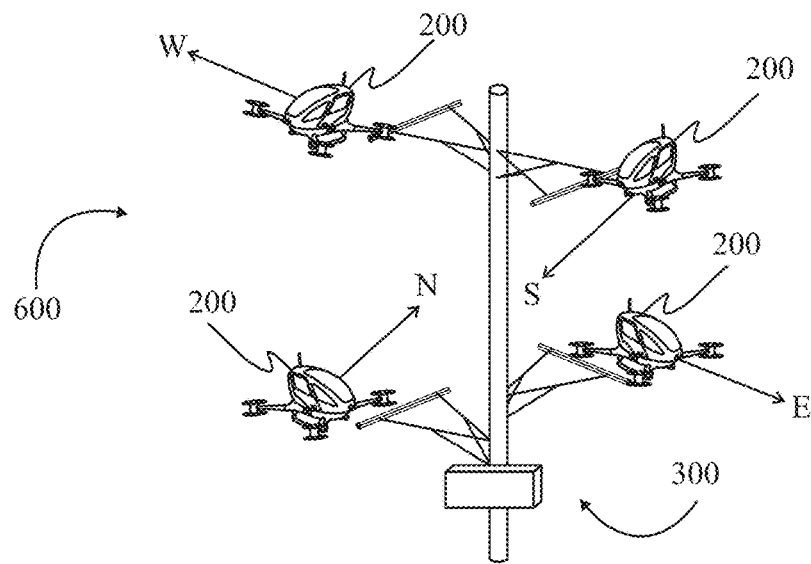
FIG. 6A is an illustration of a charging rail implementation according to one embodiment of the present invention.
Figure 6B:
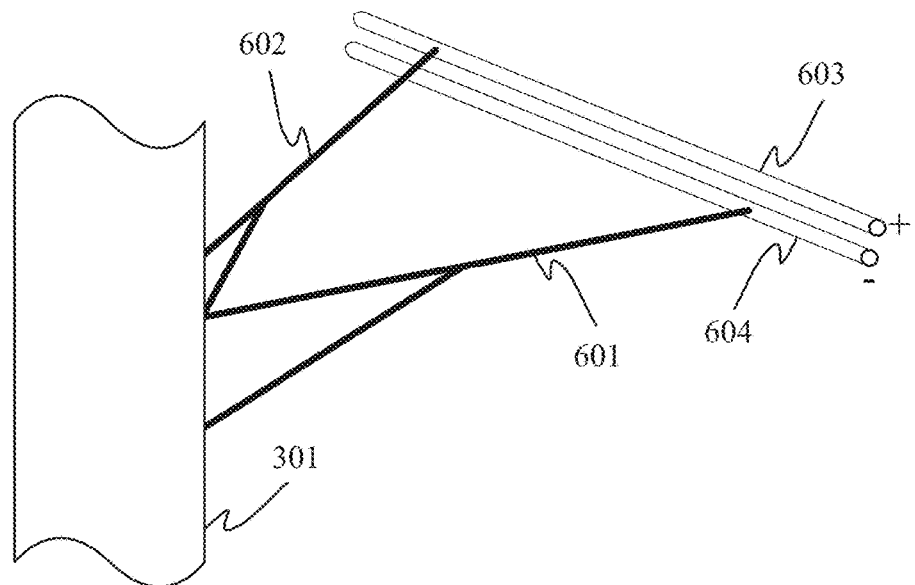
FIG. 6B is an expanded view of a single charging rail according to one embodiment of the present invention.

FIG. 6A is an illustration of a fixed-rail charging station system 600, and FIG. 6B is an expanded view of a single rail connection from fixed-rail charging station system 600 according to one embodiment of the present invention. In this embodiment fixed-rail charging station system 600 is equipped with a positive rail 603 and a negative rail 604. Each of rails 603 and 604 are held out away from, and generally perpendicular to charging pole 301 by brackets 601 and 602. Brackets 601 and 602 may hold rails 603 and 604 at a distance from charging pole 301 to make them easily accessible to an engaged drone 200. Brackets 601 and 602 also serve a purpose of connecting rails 603 and 604 to a power grid, each bracket connecting exclusively with its own rail in any given set in this embodiment of the present invention. In order to receive a charge from the fixed rail charging station system, engaged drone 200 may have a charging receiver with fixtures that makes contact with rails 603 and 604, such as brushes, as the drone cruises through a charging zone at a pre-determined speed until the end of the rails 603 and 604 is reached. Drones in some embodiments may not continue to move along the length of charging rails, but may, in some cases, be motionless, or even reverse direction along the charging rails. It is necessary that the reception interface of the drone be in contact with the charging rails while charging takes place.

In addition to an elevated charging station system descriptions above, the charging mechanisms shown herein may also be used in a ground docking embodiment. In this embodiment of the present invention, there may be present an open lot, similar to a parking lot used for cars, where a drone may dock to receive a charge using a charging mechanism such as those illustrated in FIGS. 4A to 6B. A multi-level structure, similar to a parking garage, may also be used to implement this embodiment of the present invention.

As a drone approaches a ground docking lot, the drone may engage with a computer system managing the docking lot. The docking lot may have sensors present that may be able to report to the computer system information which may include spaces which are vacant for charging, or any emergency incidences that any incoming drone may need to avoid. The drone may report to the computer system its charging needs, such as charging port type, current battery levels, and expected amount of time the drone may be docked. The computer may report to the drone such information as currently open spaces that meet the drone's criteria, and any special flying directions to reach a particular open space. After which, a confirmation may take place between the two and the drone may fly to a designated docking space to charge.

The series of FIG. 7 is a set of illustrations corresponding to snapshots of various stages in the process of approaching and receiving a charge from a charging station system. It should be understood that these figures are illustrated as examples, and only one connection will be shown. This is not indicative of any limitation to the present invention.

FIGS. 7A through 7F illustrate steps in which an incoming drone 200 approaches an entry zone 305 of a charging station system 700 for charging. Charging station system 700 comprises a charging pole 301, a controller 302, a charging mechanism 303, and a charging zone 304. In this illustration, drone 200 is wirelessly communicating with the charging station system 700, and has received a go signal from charging station system 700 to approach for a charge, along with a charging speed determined by calculations done by controller 302 in order for drone 200 to receive an adequate charge to guarantee safe travel to a next destination. This process is expanded upon in description of FIG. 9 below.

Figure 7A:
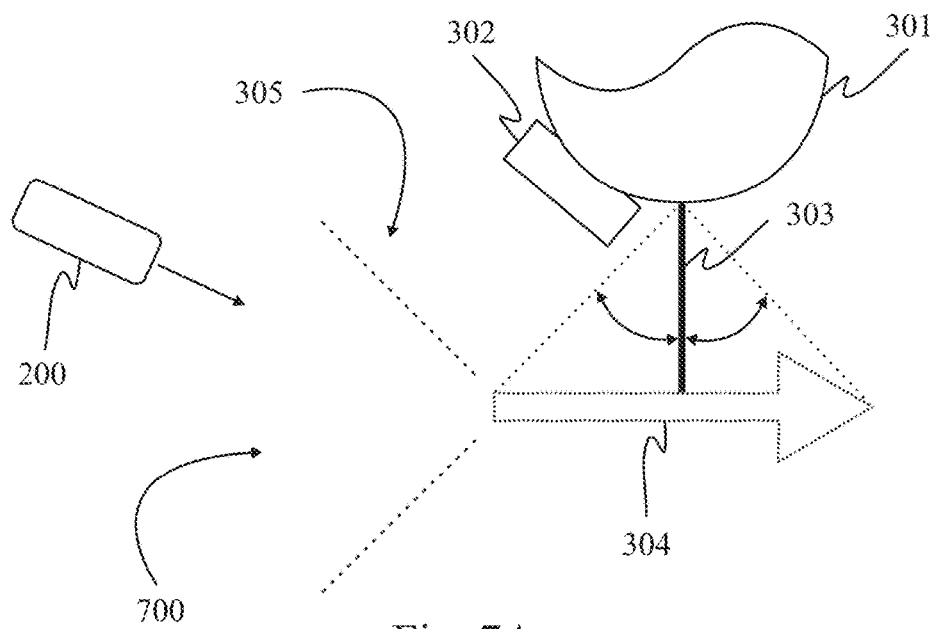
FIG. 7A is an illustration of a drone entering a predesignated charging zone according to one embodiment of the present invention
Figure 7B:
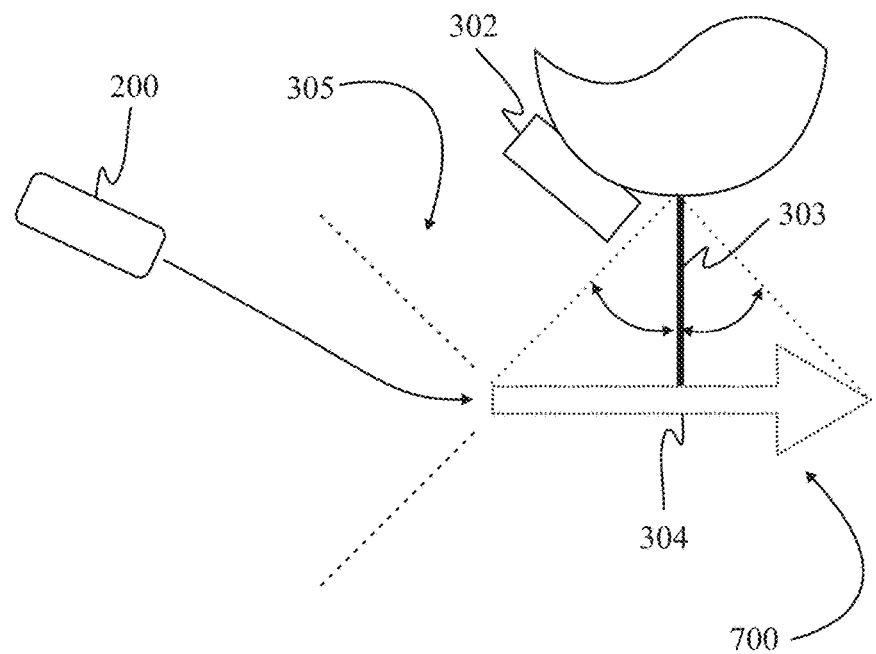
FIG. 7B is an illustration of a drone course-correcting to attain the correct orientation to receive a charge from the charging station according to one embodiment of the present invention.

FIG. 7B illustrates a step in which a drone 200 decelerates to attain the pre-determined charging speed. As drone 200 travels through entry zone 305, and before it reaches a charging zone 304 entry, the drone 200 adjusts its orientation and altitude to interact with charging mechanism 303 with consideration for weather conditions around charging station system 700, which may be reported to drone 200 through wireless communications. Note that the wind has much more of an effect at the reduced speed of the drone while charging at the station. The drone's direction will need to change to maintain traveling in the direction of the arrow. The worst case would be when the wind is the same speed as the drone speed and is perpendicular to the arrow. In this case the drone needs to rotate direction up to 45 deg to the arrow to maintain the direction of the arrow. This means that the drone's receptacle must be capable of engaging the charging entity over a range of +/−90 deg relative to the drone.

Figure 7C:
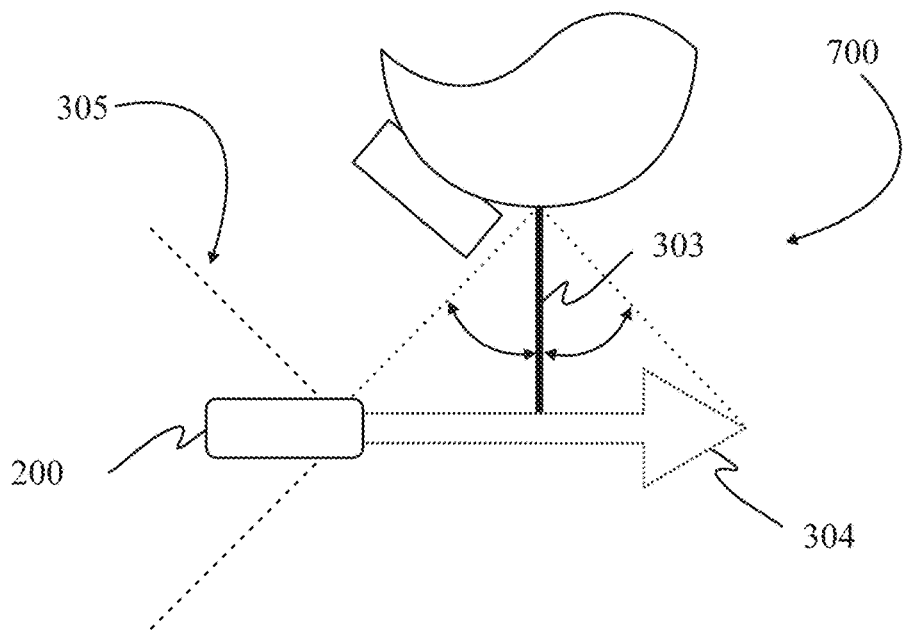
FIG. 7C is an illustration of a drone positioned with the correct orientation at the entry point of the charging station's charge zone according to one embodiment of the present invention.

FIG. 7C illustrates a step in which drone 200 has reached the charging zone 304 entry, and aligned and connecting with charging mechanism 303. At this step, drone 200 has slowed down to the pre-determined charging speed, charging power is applied to the drone, and then the drone proceeds to cruise through charging zone 304 while connected to charging mechanism 303. Mechanism 303 rotates and retracts relative to the supporting pole as the drone passes through the charging zone, as shown.

Figure 7D:
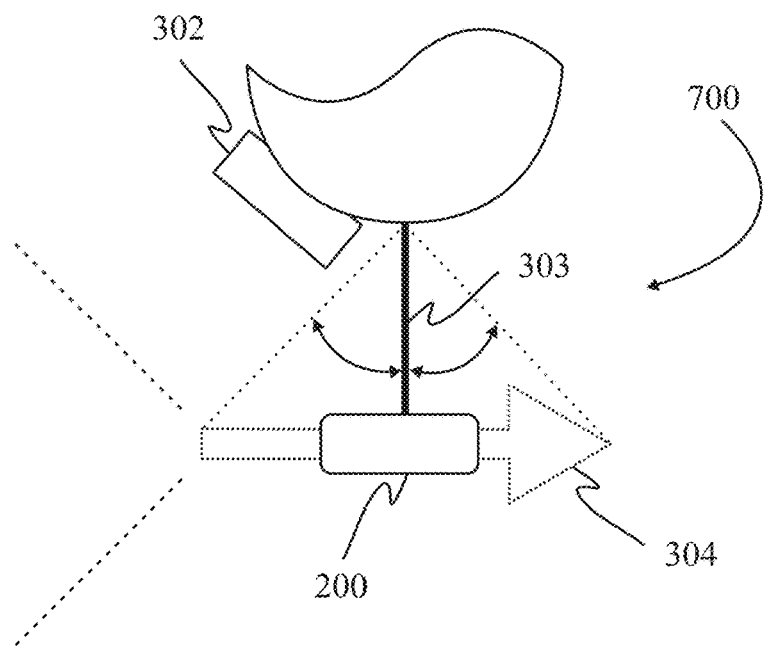
FIG. 7D is an illustration of a drone in the process of receiving a charge according to one embodiment of the present invention.

FIG. 7D illustrates a step in which drone 200 has reached a midpoint of charging zone 304. Drone 200 continues to cruise through charging zone 304 all the while battery levels are constantly checked and reported between drone 200 and controller 302. If the battery is reported as fully charged, the charging system may stop charging at any point in the process, and drone 200 continues on to the charging zone 304 exit, where charging power is removed, if not done so already.

Figure 7E:
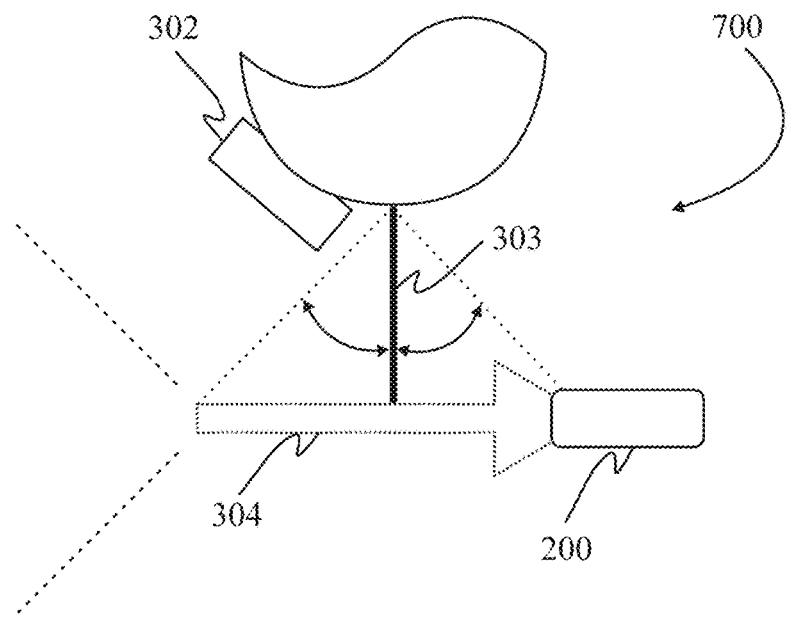
FIG. 7E is an illustration of a drone reaching an exit point of the charge zone according to one embodiment of the present invention.

FIG. 7E illustrates a step in which drone 200 reaches the charging zone 304 exit. At this point, drone 200 disconnects from charging mechanism 303 as necessary, and performs safety checks, and reports whether the charge performed provided enough energy for drone 200 to safely reach a next destination. Once all systems are confirmed to be correct, and safe to proceed, charging station system 700 may report to a next charging station system to expect drone 200, perhaps in a particular time window.

Figure 7F:
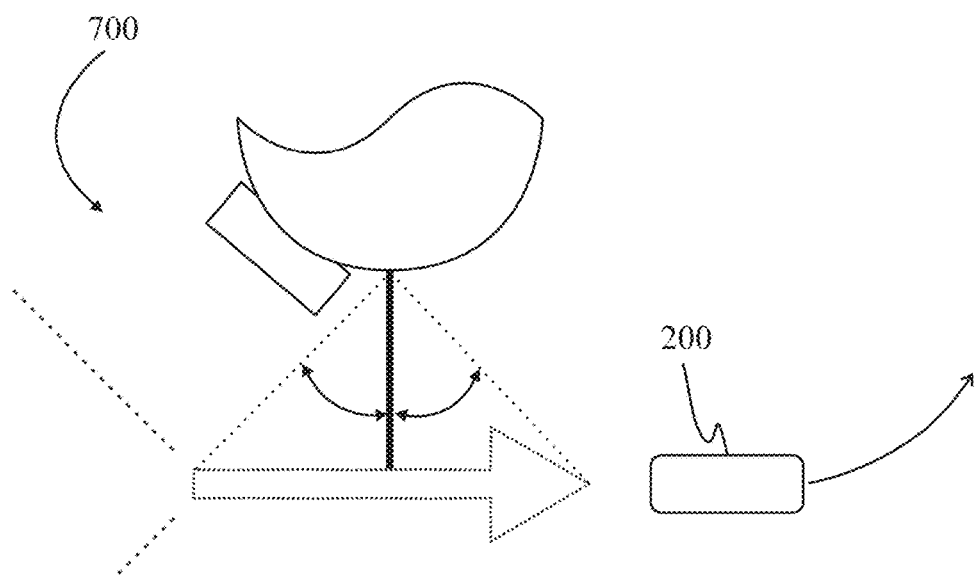
FIG. 7F is an illustration of a drone departing from a charging station, and moving onto a next charging station while en-route to its destination according to one embodiment of the present invention.

FIG. 7F illustrates a step in which drone 200 departs from charging station system 700. This may occur after charging station system 700 has received an acceptance confirmation from a next charging station system, that has added drone 200 to a queue of incoming drones for the next station. An alternative scenario may be that drone 200 has enough power in its reserves to reach a final destination and may not need to stop by another charging station system. Drone 200 returns to a correct altitude, direction and velocity and continues on its journey.

Figure 8:
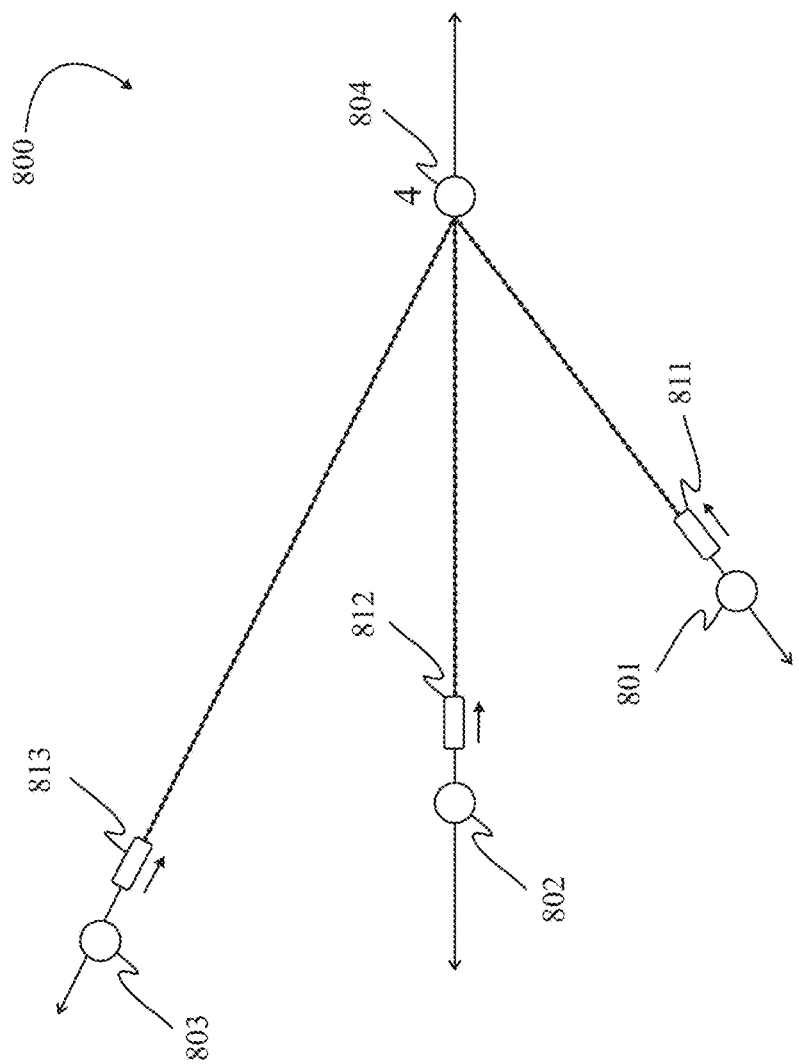
FIG. 8 is an illustration of an example case dealing with multiple approaching drones to a single station according to one embodiment of the present invention.

FIG. 8 is an illustration of a queueing system 800 in which a destination charging station system 804 interacts with a plurality of incoming drones: a first drone 811, a second drone 812, and a third drone 813. Each of charging station systems 801, 802, 803, and 804 are explained in further detail in description of FIG. 3 above. The system of the present invention is capable of handling many more drones, but three is used in this instance as an example. At this particular moment, first drone 811 has departed from a first charging station system 801, second drone 812 has departed from a second charging station system 802, and third drone 813 has departed from a third charging station system 803. Before each of the drones 811, 812 and 813 departs from their respective charging station systems, they each receive a pre-calculated travel velocity from the respective charging station systems, as well as being added to a queue kept by next destination charging station system 804. The travel velocity may be different for each drone, depending on a variety of determinants, such as weather conditions and their distance from the destination charging station system 804, to allow each of the drones 811, 812, and 813 to travel at their respective velocities as constantly as possible, and reach destination charging station system 804 just as the immediately preceding drone completes its charging cycle and a charging mechanism of destination charging station system 804 is ready to begin charging a next drone.

An important purpose of queueing system 800 is to keep a smooth flow of incoming drones without a need to keep drones hovering around any particular charging station system for too long. Hovering may also create hazardous conditions if too many drones are hovering and waiting for their turn to charge before departing. However, if a situation arises in which a drone arrives earlier or later than expected, such as in the case of unexpected winds or drone malfunction, change in queueing and hovering may take place on-the-fly without complete system failure. Communications between the charging station systems and drones may adjust travel velocity between charging station systems to account for any unexpected turn of events, to allow the system to normalize.

Figure 9:
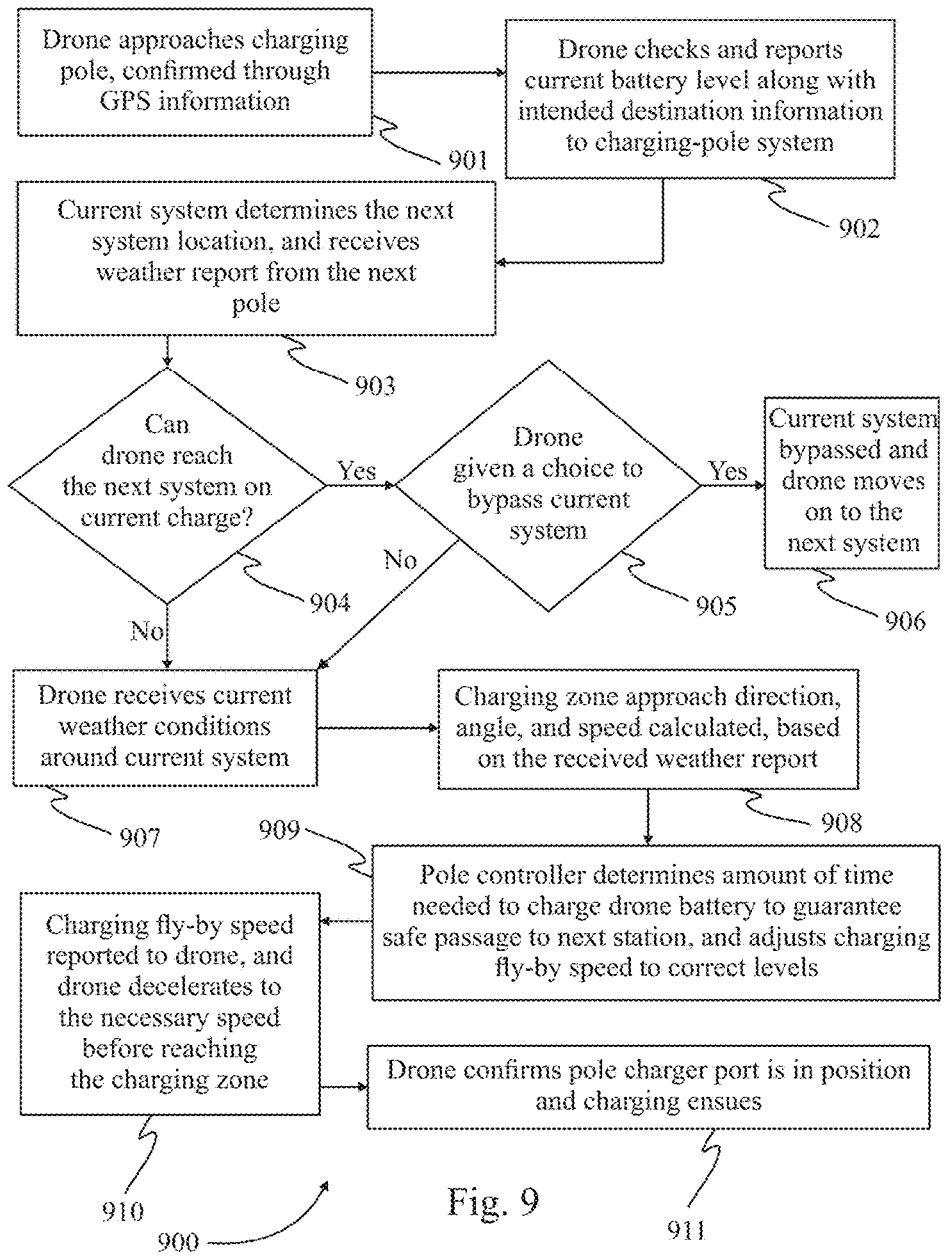
FIG. 9 is a flowchart of an example procedure for drone approach to a charging station according to one embodiment of the present invention.

FIG. 9 is a flow chart 900 showing steps for a drone approach in an embodiment of the invention. At step 901 a drone approaches a charging station system, but is still a fair distance from entering a charging zone of the charging station system. The arrival of the drone may be determined in a variety of ways, such as by a global positioning system or by a radio triangulation system and/or by other means. At step 902, the drone reports its energy levels to the charging station system, along with the drone's intended destination. At step 903, a controller of the charging station system determines a next charging station system along the drone's route to reach its intended destination. In conjunction with weather reports around the current and next charging station, and battery levels, the controller may determine whether the drone is able to reach the next charging station system without needing a charge. At step 904, if the drone can reach the next charging station system, step 905 is reached, and a passenger in the drone, or intelligence in the drone, is provided an option of charging at the present charging station system or bypassing the present charging station system. If the decision is to bypass the present charging station system, step 906 is reached and the drone receives information regarding the next charging station system, and bypasses the present charging station system. The information regarding the next charging station system may include, but is not limited to, positional information, weather information, and a speed in which to travel to reach the next charging station system at an optimum time. Returning to step 904, if the drone cannot reach the next charging station system, or in step 905 the decision is to receive a charge at the present charging station system, step 907 is reached. The present charging station system may communicate a report to the drone to convey information such as weather conditions or any emergency situations surrounding the present charging station system. At step 908, a charging zone approach speed and direction is determined based at least in part by the weather report received. At step 909, specific needs for charging the drone are determined based on the drone's current battery level as well as the weather conditions, which may include amount of time needed to charge, and a charging velocity to maintain while receiving a charge to ensure an adequate charge is received. At step 910 the charging speed is reported to the drone, and the drone decelerates to the necessary speed and descends before reaching the charging zone. At step 911, the drone confirms a charging mechanism of the present charging station system is engaged. Once the charging mechanism engages with the drone, charging begins, which is detailed in FIG. 10.

Figure 10:
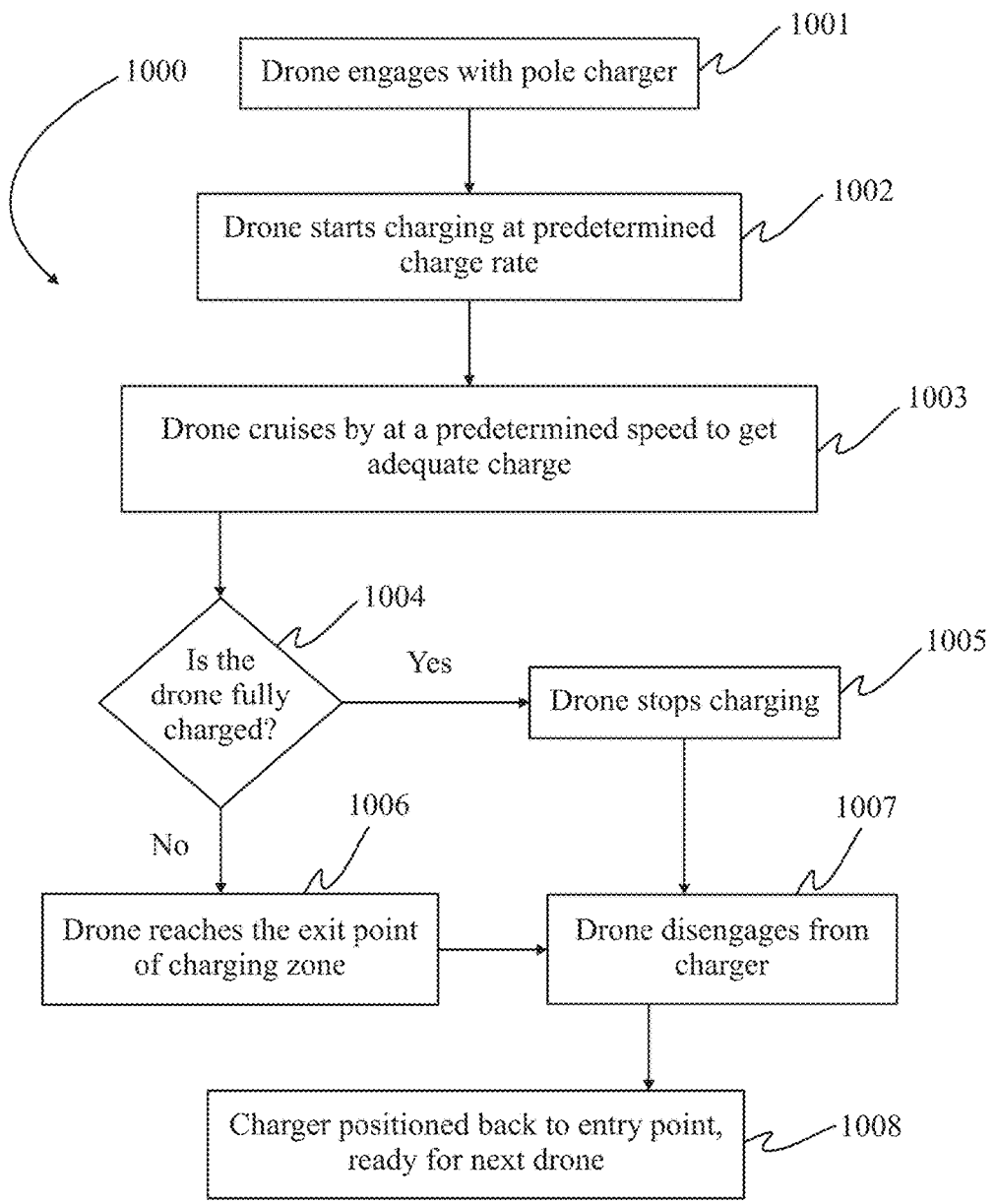
FIG. 10 is a flowchart of an example procedure during the charging process according to one embodiment of the present invention.

FIG. 10 shows a flowchart 1000 of what may occur during charging. At step 1001, which may follow immediately after step 911, a drone connects to a charging mechanism of a charging station system. At step 902, the charging station system provides a charge at a controlled rate that was predetermined during the approach stage described with reference to FIG. 9. At step 1003, the drone cruises through a charging zone of the charging station system at a pre-determined charging speed, while receiving a charge from the charging station system. During charging, charge capacity and state is checked at step 1004. In the case that the drone becomes fully charged, step 1005 is reached. At step 1005, the drone stops charging, and the charging mechanism may disconnect while the drone continues to cruise towards the charging zone exit and step 1007 follows. Returning to step 1004, if the drone doesn't reach max battery charge for the entire duration while in the charging zone, step 1006 is reached. At step 1006, the drone reaches the exit, finishing its charging cycle and step 1007 follows. At step 1007, the drone disengages with the charging station system. At step 1008, the charging mechanism is positioned back to the charging zone entry, and ready to receive a next drone for charging.

Figure 11:
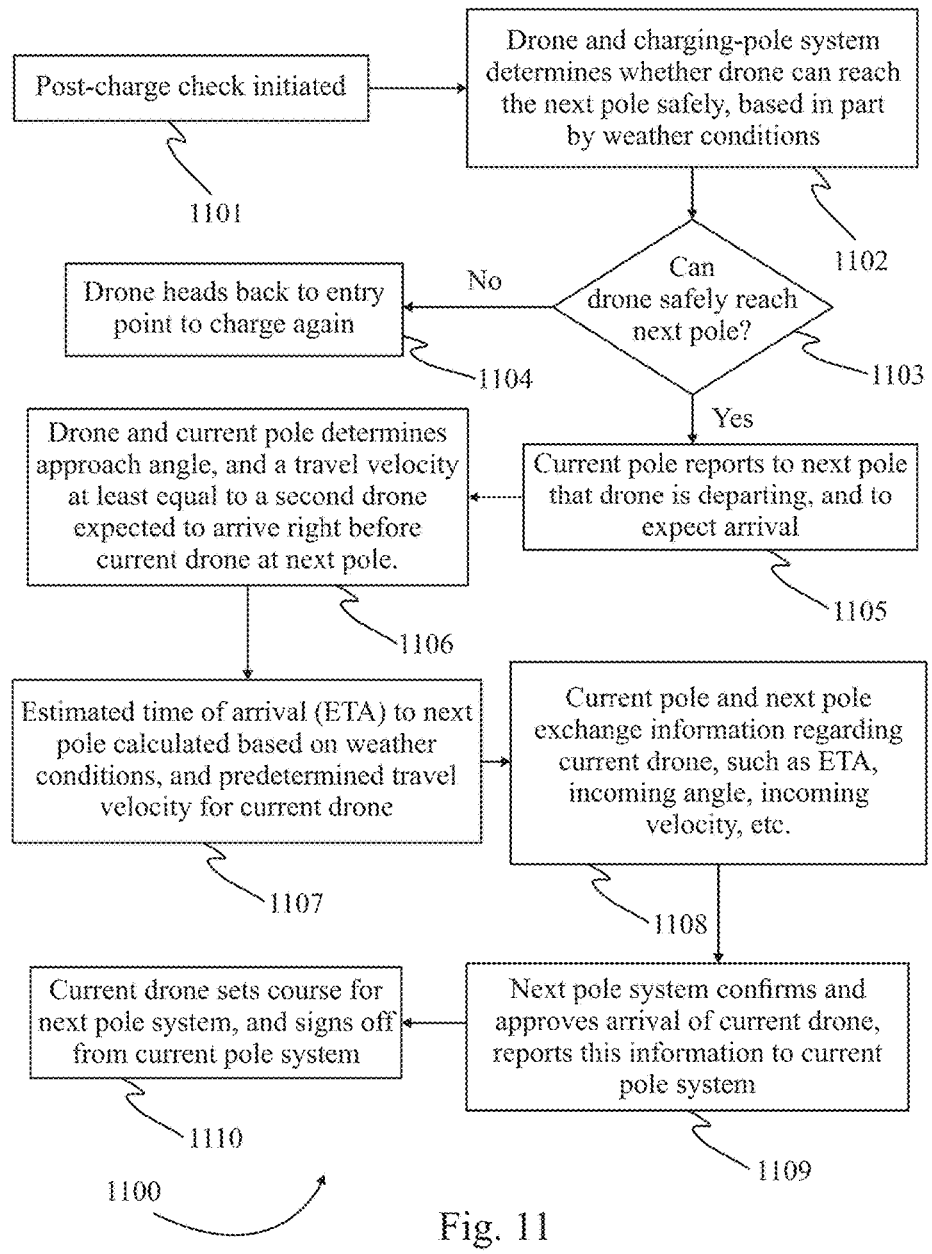
FIG. 11 is a flowchart of an example of a post-charging process between charging station and drone immediately disconnecting from charging according to one embodiment of the present invention.

FIG. 11 is a flowchart 1100 of a post-charging process before a drone departs from a present charging station system and heads towards a next charging station system or a final destination. At step 1101, a post-charge check is initiated. Checks that may be performed may include, but are not limited to, post-charge battery-level check, and drone status updates in case maintenance issues occurred. At step 1102, a controller of the present charging station system performs a calculation based on weather conditions and the drone's post-charge status to ensure that the drone may reach a next destination safely. At step 1103, if the drone has been determined to not be able to reach the next destination, step 1104 is reached, and the drone may be re-added to a queue to be charged further. The queue position of the drone to be recharged may be in front of drones that haven't reached the present charging station system. As the drone re-enters the queue, the speed of other incoming drones may be adjusted on-the-fly via wireless communications controlled by the controller to prevent hovering of drones around the present charging station system. Returning to step 1103, if the drone has been determined to be able to reach the next destination, step 1105 is reached, and the present charging station system may alert a next charging station system that the drone is departing and to expect arrival. At step 1106, direction and a travel speed is determined that is at least equal to a second drone on the queue that is scheduled to arrive at the next charging station system immediately before the present drone. At step 1107, an estimated time of arrival at the next charging station system is calculated, based on at least information pertaining to weather conditions, and the determined travel velocity. At step 1108, the present charging station system reports to the next charging station system the gathered information. At step 1109, the next charging station system accepts arrival of the drone, and sends a confirmation to the present charging station system. At step 1110, the drone signs off from the present charging station system, and begins flying towards the next charging station system at the pre-determined velocity.

The scenario in FIG. 11 is for a drone traveling from one charging station system to a next charging station system. In a situation in which the next destination is the final destination, the process may end as early as step 1102. It will be apparent to one with skill in the art, that the embodiments described above are specific examples of a single broader invention which may have greater scope than any of the singular descriptions taught. There may be many alterations made in the descriptions without departing from the spirit and scope of the present invention.

Figure 12:
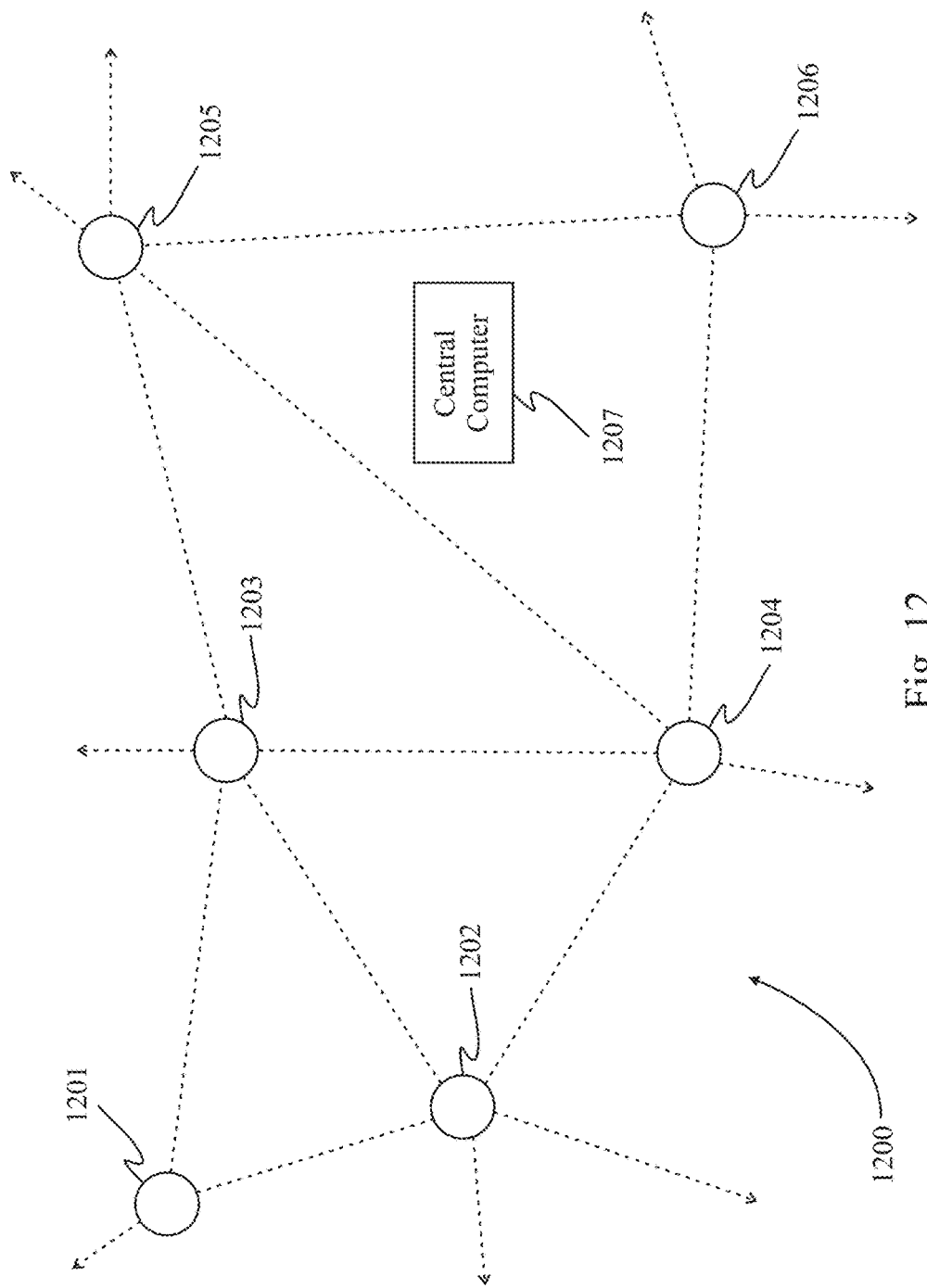
FIG. 12 is an illustration of a segment of an example system according to one embodiment of the present invention.

FIG. 12 is an illustration of a segment 1200 of an example system according to one embodiment of the present invention. Segment 1200 comprises a plurality of charging station systems 1201, 1202, 1203, 1204, 1205, and 1206. Each of the charging station systems may be linked to a number of other charging station systems through predesignated communication paths, which may be wireless or land-line paths. For example, charging station system 1201 is shown as linked to charging station systems 1202 and 1203 in FIG. 12. Any drone that has finished its charging cycle, and is reported to be heading eastward may be directed towards charging station system 1203, while any drone heading southward may be directed to charging station system 1202. It should be understood that other charging station systems may exist outside the boundaries covered in FIG. 12.

Figure 13:
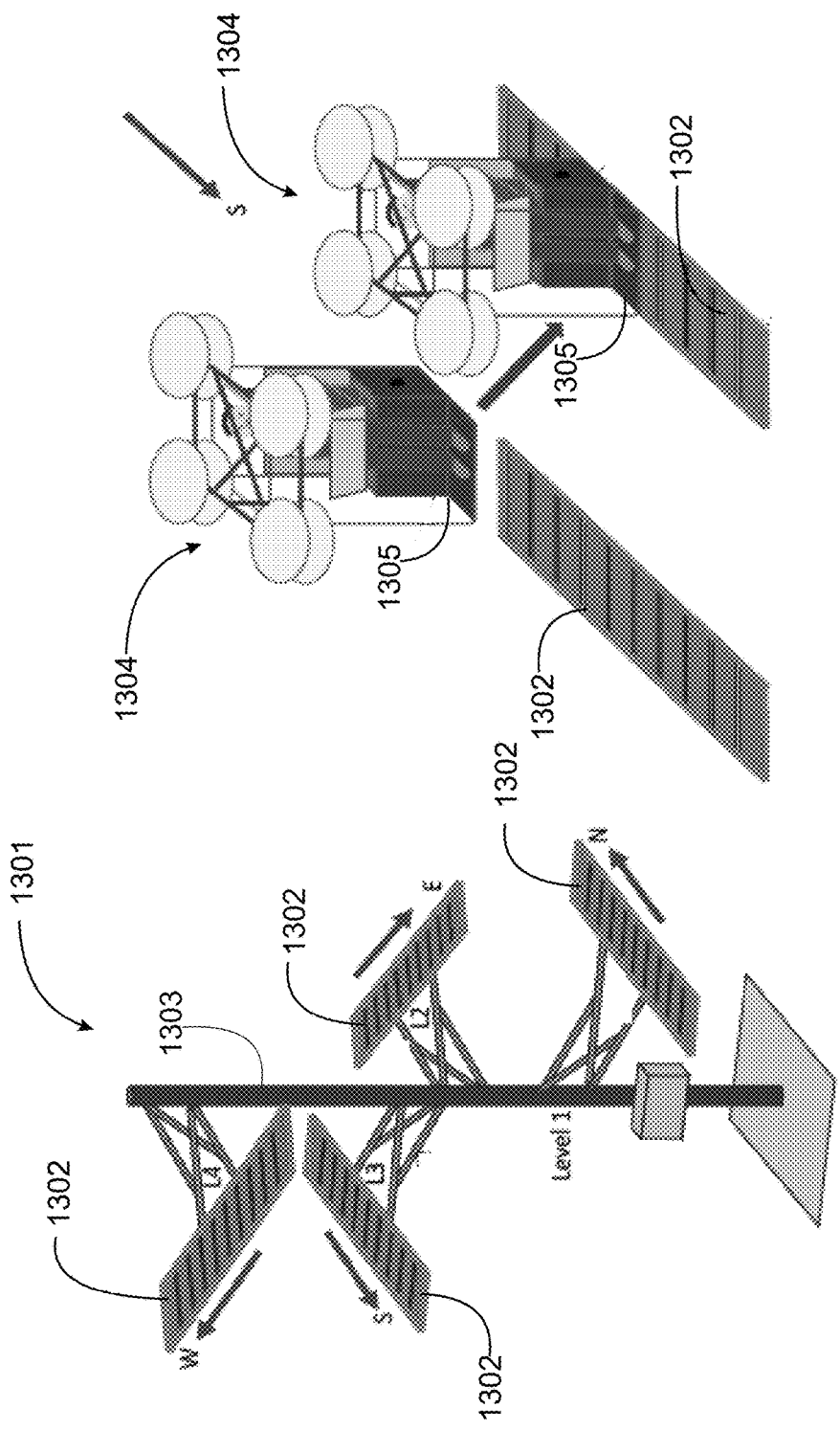
FIG. 13 is an illustration of a charging station in an alternative embodiment of the invention.
Figure 14:
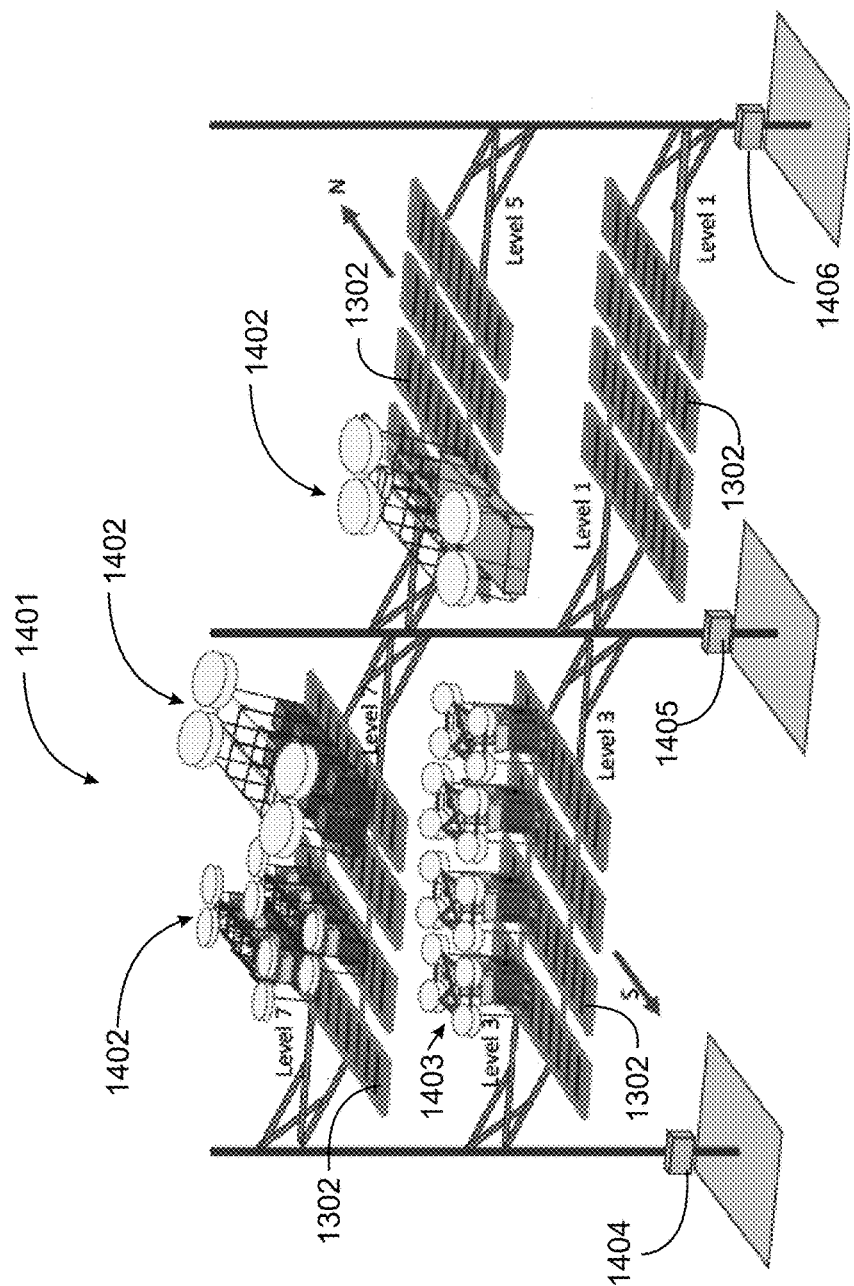
FIG. 14 is a charging station in yet another embodiment of the invention.

FIG. 13 is an illustration of an arrangement of apparatus and a method for charging pods and drones not described above. Pole 1303 in this illustration is analogous to the central pole 301 described above with reference to FIG. 3. In the embodiment described here with reference to FIG. 13, however, the apparatus and charging method employs rows of charging pads 1302. The centrol pole in this example supports four rows of charging pads for four different drone charging directions, all at different levels, Level 1 to L4. Charging is provided from a row of charging pads 1302 that are supported by struts from pole 1303. Pads 1302 wirelessly power-connect to a charging receiver at the base of the drone pod's battery at 1305. As a pod approaches the charging zone, sensors detect when the pod is close to the elevated charging pads 1302, and the pod's computer activates the charging receiver underneath the battery to be ready to be charged. The pads charge the pod's battery while the pod is passing over the pads 1302. Charging stops when the pod has just passed the last pad in the row of pads. The pole controller manages the power and communications with other poles and nearby exchange stations. It will be clear to the skilled person that there are a number of variations that may be made in the example just described, within the scope of the invention FIG. 14 illustrates how charging 4-Pod drones and 1-Pod drones can be achieved via multiple rows of wireless pads above a freeway or street. N, S, E, W directions are relative directions, just for ease of explanation, and need not be in those directions.

The central pole 1303 can be in the central reservation of a freeway or the middle of a street. The west and east poles can be located just off the freeway or road, or, in a town can be off tall buildings. North-south going 1-pod drones 1403 are shown being charged at Level 3 (north to south) and Level 1 (south to north, pods not shown). North-south going 4-pod drones 1402 are shown being charged at Level 7 (north to south) and Level 5 (south to north, pods not shown). West pole controller 1404, mid-pole controller 1405, and east pole controller 1406 work together to control the charging of all the drones.

Figure 15:
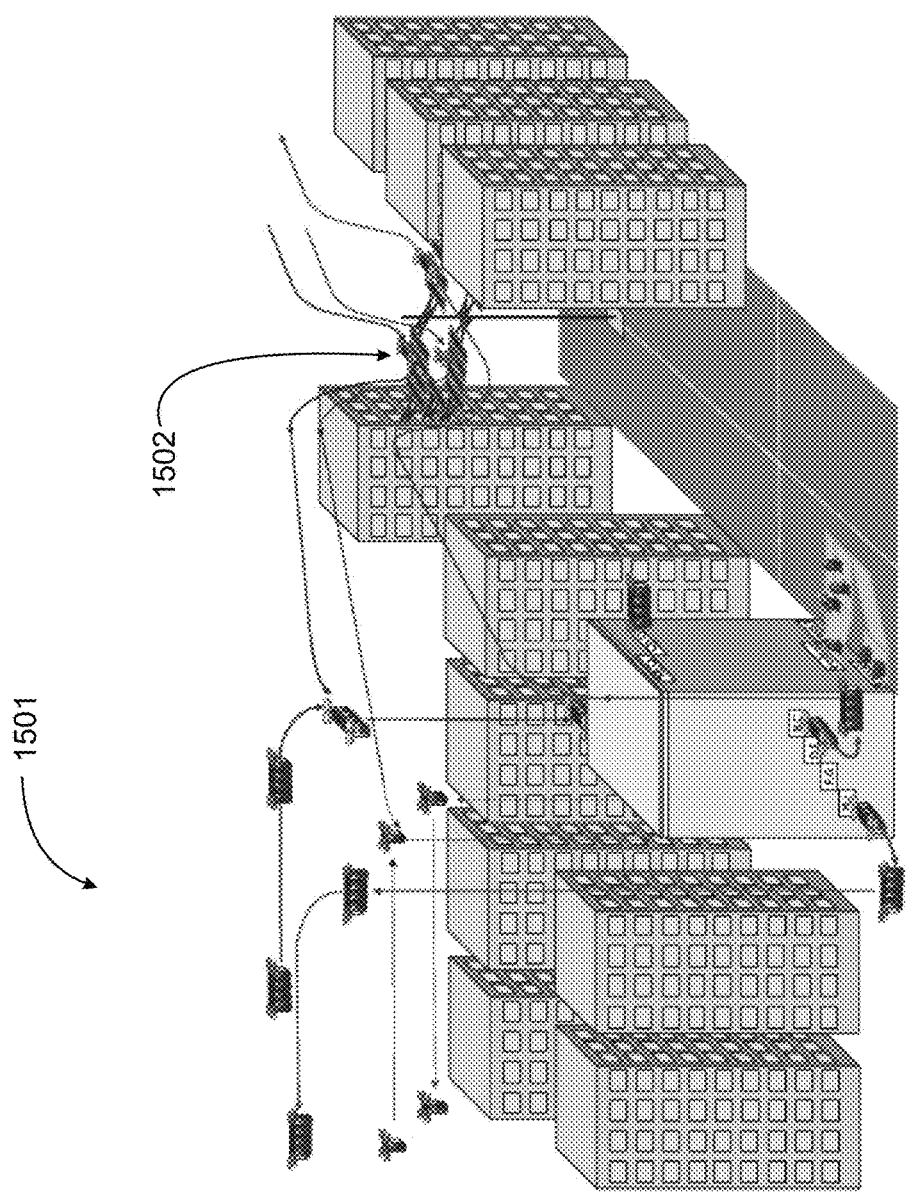
FIG. 15 is an illustration of a charging station in still another embodiment of the invention.

Note that the heights of the charging stations on the poles shown in FIGS. 13, 14 and 15 almost certainly will not be the same heights as higher droneways. This means drones approaching poles will have to descend to a lower height before joining the pole zones and then ascend again after charging is complete. The rows of pads could be separated by a distance that also allows big-pods with two rows of seats with charging receivers underneath to be charged. Similarly, drones carrying freight or goods in a single wide specially designed pod could be charged.

FIG. 15 shows how the wireless charging pad method may be applied in a town or city, perhaps nearby a tower exchange station. In FIG. 15, the west and east poles are replaced by the struts fixed to the buildings on either side of the street at region 1502.

If, for example, the charging length of the pads is 10 m, and if the drone is traveling at 45 kph and doesn't slow down for charging, then speed during charging=45×1000/3600 m/s=12.5 m/s, and charging will take 10/12.5=0.8 s. If the pod battery energy density is 400 Wh/L, and the battery is say 100 L, battery charge capacity is 40 kWh. Assuming that the battery is charged up the same amount that it discharges before its next charge, then the battery receives 0.5% of full charge during charging=0.2 kWh, and drone battery discharges 1 kWh over 5 km, then pod can travel another 1 km before it needs to be re-charged to the same level. Charge rate needs to be 0.2 kWh in 8 s, so charger must charge 0.2×3600/0.8 kW=900 kVA or say 1000 V @ 900 A. This is still a lot of V and A for wireless power! But in the nearer future, it might be more practical to have the poles 200 m apart, for 1000 V at 180 A.

In the descriptions above referring to FIGS. 13, 14 and 15, the rows of charging pads are substantially planar and horizontal, and there is a charging receiver, also oriented horizontally at the base of the pod battery at the lower extremity of the pod. In an alternative arrangement the wireless pads might be in a substantially vertical plane, and the charging receiver pads on the pods would be implemented to be complementary to the orientation of the charging pads.

It is understood by the inventor that there may at times be maintenance and repair issues with drones in service and operation, and that a system of charging stations as proposed and described in enabling detail in this application will afford an opportunity for addressing such issues. For example, there may be facility added at individual charging stations, or at every one of the drone charging station systems to allow a drone to land, and power down, and be serviced by personnel who may be associated with an enterprise hosting such charging station systems. The central computer aspects, and the communications aspects are useful in providing such services as well. Control procedures may be added at charging stations to direct drones to land for service and to take off again, and to record service instances, for example.

Segment 1200 may also have a central computer 1207 which may receive transmissions from charging station systems within a designated range. Transmissions that may be received may include, but may not be limited to, system alerts, weather alerts, maintenance requests, and tracking and positioning of various drones around the charging station systems. Central computer 1207 may be connected to a wide-area network, where it may connect with other central computers of other system segments to cover a more comprehensive area.

In various embodiments of the invention an important issue in drone recharging is spacing of recharge stations, which is a function of drone range and charge times. Table 1 below shows how different parameters affect pole spacing. Calculations are based on an assumption that a drone acquires enough charge at each station to discharge a substantially equal amount to reach the next charging station. On the last leg of a trip a drone may need to travel further than standard station spacing, for example to someone's remote house, so the drone will need sufficient charge so that it can be able to discharge all the way to a re-charging destination. A longer charge time enables a longer distance between stations. In development of charging systems battery charging rate capability could increase up to 60 kWh/ min. This may be crucial to allow drones to fly by stations faster to minimize queueing or to allow shorter gaps between drones. Also, the faster the mechanical engagement and disengagement times are the longer the charge time can be. The fastest charge time is if the drone can fly by at cruising speed $V_c$, but this requires the drone to flyby in less than a second which probably will be some time in the future.

cabling, like 110 kV AC with transformers, rectifiers and DC-DC converters per station. But preferably there would be dedicated high voltage DC cable feeders which may be less expensive, because just a DC-DC converter is needed. It might be dangerous for above-ground high voltage cabling with the drones flying around, so underground cabling is recommended.

TABLE 1

| Discharging Battery | | | | | | | | | |
|---|---|---|---|---|---|---|---|---|---|
| Total Rotor Motor Power | kW | 30* | 30* | 30* | 30* | 30* | 15* | 15* | 15* |
| Drone Cruise Speed | km/h | 45* | 90* | 90* | 90* | 90* | 90* | 90* | 90* |
| Drone Cruise Speed | m/s | 12.5 | 25.0 | 25.0 | 25.0 | 25.0 | 25.0 | 25.0 | 25.0 |
| Discharge Distance | m | 1000* | 1000* | 2000* | 1000* | 1000* | 1000* | 1000* | 1000* |
| Max Distance Between Stations | m | 1000.0 | 1000.0 | 2000# | 1000.0 | 1000.0 | 1000.0 | 1000.0 | 1000.0 |
| Drone Time Between Stations | s | 80.0 | 40.0 | 80.0 | 40.0 | 40.0 | 40.0 | 40.0 | 40.0 |
| Drone Discharges | Wh | 666.7 | 333.3 | 666.7 | 333.3 | 333.3 | 166.7 | 166.7 | 16.7 |
| Charging Battery | | | | | | | | | |
| Charge Voltage | V | 1000* | 1000* | 1000* | 1000* | 1000* | 1000* | 1000* | 1000* |
| Charge Current | A | 100* | 100* | 200* | 400* | 1000* | 400* | 1000* | 1500* |
| Charging Time | s | 24** | 12** | 12** | 3# | 1.2# | 1.5# | .6** | .4** |
| Pole Charge Distance | m | 10* | 10* | 10* | 10* | 10* | 10* | 10* | 10* |
| Minimum Cable Length | m | 7.1 | 7.1 | 7.1 | 7.1 | 7.1 | 7.1 | 7.1 | 7.1 |
| Drone Speed at Station m/s | m/s | 0.4** | 0.8** | 0.8** | 3.3# | 8.3# | 6.7# | 16.7 | 25.0 |
| Drone Speed at Station km/hr | km/hr | 1.5** | 3.0** | 3.0** | 12# | 30# | 24# | 60.0 | 90.0 |
| Drone Charge (=Discharges) | Wh | 666.7 | 333.3 | 666.7 | 333.3 | 333.3 | 166.7 | 166.7 | 16.7 |
| Min Time Between Drones | s | 28.8 | 14.4 | 14.4 | 3.6 | 1.4 | 1.8 | .7** | .5** |
| Min Gap Between Drones | m | 360.0 | 360.0 | 360.0 | 90.0 | 36.0 | 45.0 | 18.0 | 12.0 |
| Max No. Drones/Hr | D/h | 125.0 | 250.0 | 250.0 | 1000# | 2500# | 2000# | 5000.0 | 7500.0 |
| Charge Rate | Kwh/m | 1.7 | 1.7 | 3.3 | 6.7 | 16.7** | 6.7 | 16.7** | 25.0** |

*(single asterisk) = manual entry
**(double asterisk) = undesirable
(pound sign) desirable In Table 1, all combinations use 10 m charge length, all use 7.1 m minimum cable length, all use a total of 30 KW motor power except options 6-8 that assume increased cruising efficiency with 15 kW, all use 1000 V charge voltage, all except #1 have a cruise speed 90 km/h, all pole spacing is 1 km but #3.

Summary of Options:
1. Charge of 100 A, cruise speed 45 km/h, pole speed 1.5 km/h, charge time 24 s at pole, can handle 125 drones/h
2. Charge of 100 A, pole speed 3 km/h and charge time 14 s at pole can handle 250 drones/h
3. Charge of 200 A, pole speed 3 km/h and charge time 14 s at pole, can handle 250 drones/h
4. Charge of 400 A, pole speed 12 km/h and charge time 3.6 s at pole, can handle up to 1000 drones/h
5. Charge of 1000 A, pole speed 30 km/h and charge time 1.4 s at pole, can handle up to 2500 drones/h
6. Charge of 400 A, pole speed 24 km/h and charge time 1.8 s at pole, can handle up to 2000 drones/h
7. Charge of 1000 A, pole speed 60 km/h and charge time 0.7 s at pole, can handle up to 5000 drones/h
8. Charge of 1000 A, cruise and pole speed 90 km/h and charge time 0.5 s at pole, can handle 7500 drones/h Option 6 best. Options 7 and 8 ideal but may be too difficult to implement initially There are a number of other factors that may affect calculation of various parameters having to do with spacing and operation of charging. One such factor is electric power. Electricity will need to be provided to the charging stations. From Table 1 this could easily be 400 Wh per charge for 5000 times per hour or 2 MWh per hour or 2 MW per station. This could be even higher if all four (or more) positions on a station are fairly active. So there will need be high voltage The diameter of the cable wiring may be quite large, for example 200 A requires about 0 AWG gauge copper or about 1 cm diameter, and 400 A will require two of these and 800 A four. So this cable may be difficult to bend, such as when approaching midpoint, it may be better to withdraw the cable into a coil. And there will be two of these for positive and negative. The resistive losses in the two cables will also be large, like 2 mohm*2 for 7 m of 0 AWG at 200 A=160 W, or for 400 A, 320 W, and for 800 A, 640 W. This does not include wiring cable losses up the pole. If a much higher voltage than 1000 V can be taken up the pole into a DC to DC converter, this would save power loss, but requires the inverter to be near the charging cables on the pole. This would require u p to a 1 MW inverter which would probably be too large to be fitted higher up the pole. It would be logical to increase the voltage to the drone to avoid a DC to DC converter, so there would be a direct connection from the underground electricity to the drone. This means even more carefully designed cabling and receptacles. Also the drone battery technology will have to improve a lot from the present 2-4 hours charging time needed for the eHang184 drone, but this could be feasible with charging large ultra-capacitors which should be available by droneway introduction.

Weight of load for traveling drones will also be a factor. The drone must be capable of measuring the weight of the person or freight, because this affects the power used and the distance. A heavier load will require more charge to reach a pole or destination. This weight variation could be compensated for by adjusting the charging current I. And this will vary with wind speed. The drone will refuse to take off if it's maximum load is exceeded.

Weather will also be a factor in design and control. Weather also affects operation of the drones. For example, if a drone is traveling south to north and there is a prevailing wind of 10 m/s from north to south, the drone will be slowed by this amount. So although the airspeed is still $V_C$, the ground speed is $V_C$–10 m/s, and the drone will take longer to get to the next station, or it will need to go faster to maintain $V_C$ ground speed. If there is a cross wind, the drone will have to fly at an angle to the intended direction, to maintain the path required by the GPS data. Because the charging speed at the pole, $V_P$ is usually a lot less than cruise speed $V_C$, wind speed will have much more of an effect when the drone is at the charging station. At the charging station, the drone will have to speed up or slow down depending on wind direction, to maintain a ground speed of $V_P$ m/s. Or with a crosswind the drone will not be parallel to the relevant charging zone of the station, causing the cable receptacle to be at some angle to the drone. The receptacle design will have to allow for misalignments of direction. In such cases, the drone needs to counteract the wind speed and direction, and it will have to rotate slightly and speed up or slow down to maintain the GPS calculation of direction.

In preferred embodiments each station may detect both wind speed and direction, and feed this information, or derived information for navigation, to the drone approaching the station. For a drone traveling between stations at speed $V_C$, a good approach would be, as the drone is leaving a station, to use that pole's wind information, and then as it gets nearer to the target station, to use more and more of the target station's wind speed information and less of the first station. Obviously for really strong winds, it may be safer not to fly, but this will get more and more unlikely as time moves on and technology improves.

Also the pole and drone receptacles will have to be designed to allow for rain, snow etc., to ensure no shorting can occur at the high voltages expected. Some high speed shutter cover mechanism will be needed to open just before the two receptacles engage, possibly with the pole receptacle already inside the drone receptacle.

In regard to wind, and adjustments that may need to be made to drone navigation relative to charging stations, calculations for head winds, following wind and the like, are well-known in the art, and may be applied in this case to determine extra charge that may be needed in some cases. It may be in some cases, that an extra charge, say 20%, may have to be made to account for a head wind, for example.

This patent application teaches an alternative method of transport using new technologies that will soon be making passenger and freight drone flights both faster and more carbon friendly than road based transport. This is especially true in heavy traffic, such as at rush hour, where most cars travel at just a few km per hour. The drone approach taught here allows for much higher speeds, where the drone is at a full speed of around 90 km/h for perhaps 1 km between charging stations, although slower for less than 20 m at the charging station. This includes charging distance of 10 m in the flyby zone, and slowing down to flyby speed and speeding up afterwards to cruise speed. So for perhaps 2% of the journey the drone is at a slower speed, which is still faster than commute vehicle traffic speeds. So the average drone speed could easily be around 90 km/h, and as time goes on and the technology improves, much faster.

At some point the issue becomes: how close to a person's home and work or elsewhere will a drone be available. This now comes to the new technology of ride calling and sharing. If a passenger calls up a ride sharing company and requests a ride, if this ride is from a drone that comes to collect the person, then the drone will come from some nearby location, hopefully fully charged, may exit the droneway, and find its own way to the person. The person gets in the drone, the drone requests the person if they are ready for takeoff, and if so then automatically takes off and goes to the nearest droneway and merges in as described. At the last station before the final destination, the drone exits the droneway and flies to a landing place near the destination. This is a highly likely circumstance, as ride calling will be a standard way of traveling in the near future, that is presently just for cars. The user will just pay upfront for the requested journey as with Uber now.

A likely scenario for this new technology to become ubiquitous will require a major infrastructure development of droneways with pole-based charging stations every 1 km or so, and ground-based charging stations for longer distance travel that are likely to be used as rest areas. From a safety standpoint, theoretically droneways should be safer than road transport, once standards have been accepted, for autonomous drones and the networks controlling them. But pole-based elevated charging requires new ideas that will need to be debugged and made extremely reliable before passengers can travel in droneways. It is likely that drones will first carry small goods to iron out reliability issues.

From a cost standpoint, buying land and building charging stations for ground-based stations will be expensive. For land for the poles, it is likely that local transport entities like freeway/motorway managements and local councils will provide space for the poles to be built. There should be minimal noise, as nobody will be blowing horns or revving engines, the drone motors will be quiet, and so should the engaging and disengaging of the cables and so on at the poles.

Another issue might be how many drones per hour could use a droneway, especially at rush hour. Option 6 in Table 1 would be 2000 drones per hour, with Option 8 going to 7500 drones per hour. Commute traffic on smaller roads will be able to manage this usage, but for larger freeways, either more people per drone or more parallel droneways or both will be needed. But while the technology is being introduced, 2000 drones per hour may be sufficient. As the technology improves, more drones per hour will be introduced.

A skilled artisan will understand that the embodiments of the invention provided herein are entirely exemplary, and are not limiting to the scope of the invention. There may be other ways that equipment may be provided, and methods coordinated, within the scope indicated by the examples. It will be understood by the skilled person as well that apparatus and methods within the scope of the invention may incorporate different descriptions and examples. The scope is limited only by the claims below.

The invention claimed is:

1. A charging system, comprising;
   a drone having electrically-powered motors;
   a passenger pod carried beneath the drone and detachable from the drone, the passenger pod having a rechargeable battery enabled to power the electrically-powered motors of the drone;
   a base structure connected to a power grid;
   a row of substantially planar wireless charging pads supported by the base structure; and
   a computerized controller enabled to communicate with the drone and to initiate, control and stop charging power;
   wherein, as the drone carrying the passenger pod approaches the row of substantially planar charging pads, the computerized controller directs the moving drone into a path bringing a charging receiver pad of the passenger pod carried by the drone, and connected to the battery of the passenger pod, into proximity with the row of substantially planar charging pads, and directs the drone to move the carried passenger pod along the row of charging pads, keeping the charging receiver pad of the passenger pod in proximity to the row of charging pads, managing speed and direction of the moving drone along the path, as charging of the battery of the passenger pod is accomplished.

2. The charging system of claim 1, further comprising a plurality of rows of substantially planar wireless charging pads, individual ones of the rows facing in different directions, and positioned at different levels, enabling a plurality of drones carrying passenger pods to charge the pod batteries.

3. The charging system of claim 1, wherein the row of charging pads is sized to accommodate the drone carrying a plurality of passenger pods.

4. The charging system of claim 2 wherein the rows of charging pads are supported from a central pole structure.

5. The charging system of claim 2 wherein the rows of charging pads are supported by framework on a roof of a building.

6. The charging system of claim 2 wherein the rows of charging pads are supported in a framework between two buildings.

7. The charging system of claim 1 wherein the row of substantially planar charging pads is oriented with the plane of the row substantially vertical, to accommodate receiver pads that are oriented substantially vertically on passenger pods.

8. The charging system of claim 1, wherein the computerized controller interacts with the drone, determining whether the drone can reach a next destination, how much charge is required, and a rate of charging to accomplish the charge.

9. The charging system of claim 1, wherein the computerized controller communicates with other charging systems at other geographic locations.

10. The charging system of claim 1, further comprising a central computer system managing and gathering data from and sharing data with a plurality of charging stations.

11. A method for charging a battery of a passenger pod carried by a separate and detachable drone having electrically-powered motors powered by the battery of the passenger pod, comprising;

providing a a row of substantially planar wireless charging pads supported by a base structure connected to a power grid;

communicating with the drone carrying the passenger pod by a computerized controller;

directing the drone into a path bringing a charging receiver pad of the passenger pod carried by the drone, and connected to the battery of the passenger pod, into proximity with the row of substantially planar wireless charging pads;

directing the drone to move the carried passenger pod along the row of charging pads, managing speed and direction of the moving passenger pod along the path, as charging of the battery of the passenger pod is accomplished.

12. The method of claim 11, further comprising a plurality of rows of substantially planar wireless charging pads, individual ones of the rows facing in different directions, and positioned at different levels, wherein drones are directed to move the passenger pods to follow individual ones of the rows of pads.

13. The method of claim 11, wherein the row of charging pads is sized to accommodate the drone carrying a plurality of passenger pods.

14. The method of claim 12 wherein the rows of charging pads are supported from a central pole structure.

15. The method of claim 12 wherein the rows of charging pads are supported by framework on a roof of a building.

16. The method of claim 12 wherein the rows of charging pads are supported in a framework between two buildings.

17. The method of claim 11 wherein the row of substantially planar charging pads is oriented with the plane of the row substantially vertical, to accommodate receiver pads that are oriented substantially vertically on passenger pods.

18. The method of claim 11, wherein the computerized controller interacts with the drone, determining whether the drone can reach a next destination, how much charge is required, and a rate of charging to accomplish the charge.

19. The method of claim 11, wherein the computerized controller communicates with other charging systems at other geographic locations.

20. The method of claim 11, further comprising a central computer system managing and gathering data from and sharing data with a plurality of charging stations.

* * * * *